US011037196B2

(12) United States Patent
Fernandez

(10) Patent No.: US 11,037,196 B2
(45) Date of Patent: Jun. 15, 2021

(54) INTERACTIVE ADVERTISING USING PROXIMITY EVENTS

(71) Applicant: Netclearance Systems, Inc., Escondido, CA (US)

(72) Inventor: David Fernandez, Escondido, CA (US)

(73) Assignee: Netclearance Systems, Inc., Escondido, CA (US)

(*) Notice: Subject to any disclaimer, the term of this patent is extended or adjusted under 35 U.S.C. 154(b) by 0 days.

(21) Appl. No.: 14/165,882

(22) Filed: Jan. 28, 2014

(65) Prior Publication Data
US 2014/0143060 A1 May 22, 2014

Related U.S. Application Data

(63) Continuation-in-part of application No. 13/752,213, filed on Jan. 28, 2013.
(Continued)

(51) Int. Cl.
*G06Q 30/00* (2012.01)
*G06Q 30/02* (2012.01)
(Continued)

(52) U.S. Cl.
CPC ..... *G06Q 30/0261* (2013.01); *G06Q 30/0267* (2013.01); *G06Q 30/0281* (2013.01);
(Continued)

(58) Field of Classification Search
CPC .......... G06Q 30/0261; G06Q 30/0267; G06Q 30/0281; H04W 4/70; H04W 4/029; H04W 4/021
(Continued)

(56) References Cited

U.S. PATENT DOCUMENTS 6,601,039 B1 7/2003 Kolls
6,769,607 B1 8/2004 Pitroda et al.
(Continued)

FOREIGN PATENT DOCUMENTS

| EP | 2948833 A4 | 8/2016 |
| WO | 2014117172 A1 | 7/2014 |
| WO | 2018107184 A3 | 8/2018 |

OTHER PUBLICATIONS

Ambient Intelligence, Markopoulos, Springer, 2004, pp. 83-94;183-194;338-349.*
(Continued)

*Primary Examiner* — David J Stoltenberg
*Assistant Examiner* — Michael I Ezewoko
(74) *Attorney, Agent, or Firm* — Genius Patent APC; Bruce Angus Hare

(57) ABSTRACT

A proximity sensor adapted to collect consumer location information is described. The proximity sensor includes: a detection module adapted to detect a user device within a threshold distance of the proximity sensor; a receiver adapted to collect data regarding the user device; and a communication interface adapted to allow the proximity sensor to send the collected data to a remote server. An advertising system includes: an advertising medium adapted to provide interactive advertising content to users via a multimedia output; a proximity sensor adapted to detect and communicate with user devices that pass within a threshold distance of the advertising medium; and a remote server adapted to communicate with the proximity sensor and to provide advertising content to the advertising medium. An interactive advertising device includes: a proximity sensor; and a display element adapted to display an advertising content element from among a set of advertising content elements.

17 Claims, 24 Drawing Sheets

Related U.S. Application Data

(60) Provisional application No. 61/603,065, filed on Feb. 24, 2012.

(51) Int. Cl.
*H04W 4/70* (2018.01)
*H04W 4/029* (2018.01)
*H04W 4/021* (2018.01)

(52) U.S. Cl.
CPC .......... *H04W 4/021* (2013.01); *H04W 4/029* (2018.02); *H04W 4/70* (2018.02)

(58) Field of Classification Search
USPC ................................................... 705/14.58
See application file for complete search history.

(56) References Cited

U.S. PATENT DOCUMENTS

| | | |
|---|---|---|
| 6,776,334 B1 | 8/2004 | Garg |
| 6,907,238 B2 | 6/2005 | Leung |
| 7,848,765 B2 * | 12/2010 | Phillips et al. ............ 455/456.3 |
| 7,907,571 B2 | 3/2011 | Raghothaman et al. |
| 7,920,849 B2 * | 4/2011 | Pop ....................... H04W 4/008 |
| | | 340/988 |
| 7,936,736 B2 | 5/2011 | Proctor, Jr. et al. |
| 8,082,187 B2 | 12/2011 | Abhari et al. |
| 8,116,749 B2 * | 2/2012 | Proctor, Jr. ......... G06Q 30/0623 |
| | | 455/414.3 |
| 8,135,624 B1 * | 3/2012 | Ramalingam et al. ...... 705/26.1 |
| 8,232,876 B2 * | 7/2012 | Derrick ................. G01S 5/0027 |
| | | 340/539.1 |
| 8,279,067 B2 | 10/2012 | Berger et al. |
| 8,484,076 B2 | 7/2013 | Roberts et al. |
| 8,489,112 B2 | 7/2013 | Roeding et al. |
| 8,583,475 B2 | 11/2013 | Wills |
| 8,941,485 B1 * | 1/2015 | Mendelson ............... 340/539.11 |
| 9,159,066 B2 | 10/2015 | Roeding et al. |
| 9,219,979 B2 | 12/2015 | Moldaysky et al. |
| 9,224,172 B2 * | 12/2015 | Churchill ............... G06Q 50/00 |
| 9,491,584 B1 | 11/2016 | Mendelson |
| 9,811,846 B2 | 11/2017 | Fernandez |
| 9,928,536 B2 | 3/2018 | Fernandez |
| 9,933,265 B2 | 4/2018 | Fernandez |
| 10,586,251 B2 | 3/2020 | Fernandez |
| 2002/0065680 A1 | 5/2002 | Kojima et al. |
| 2002/0095333 A1 | 7/2002 | Jokinen et al. |
| 2003/0137968 A1 | 7/2003 | Lareau et al. |
| 2004/0026503 A1 | 2/2004 | Gantz |
| 2004/0203566 A1 | 10/2004 | Leung |
| 2006/0031126 A1 | 2/2006 | Ma et al. |
| 2006/0287813 A1 | 12/2006 | Quigley |
| 2006/0293968 A1 | 12/2006 | Brice et al. |
| 2007/0018820 A1 | 1/2007 | Chand et al. |
| 2007/0030824 A1 | 2/2007 | Ribaudo et al. |
| 2007/0067200 A1 | 3/2007 | Patel |
| 2007/0241184 A1 | 10/2007 | Lum |
| 2007/0254674 A1 | 11/2007 | Pedigo et al. |
| 2007/0268138 A1 | 11/2007 | Chung et al. |
| 2008/0040219 A1 | 2/2008 | Kim et al. |
| 2008/0091541 A1 | 4/2008 | Law et al. |
| 2008/0109317 A1 | 5/2008 | Singh |
| 2008/0214151 A1 | 9/2008 | Ramer et al. |
| 2009/0222358 A1 | 9/2009 | Bednarek |
| 2009/0224909 A1 | 9/2009 | Derrick et al. |
| 2009/0281852 A1 | 11/2009 | Abhari et al. |
| 2009/0322510 A1 | 12/2009 | Berger et al. |
| 2010/0036772 A1 | 2/2010 | Arceneaux et al. |
| 2010/0161433 A1 | 6/2010 | White |
| 2010/0185504 A1 | 7/2010 | Rajan et al. |
| 2010/0245588 A1 | 9/2010 | Waehner et al. |
| 2011/0028093 A1 | 2/2011 | Patel et al. |
| 2011/0028160 A1 | 2/2011 | Roeding et al. |
| 2011/0029362 A1 | 2/2011 | Roeding et al. |
| 2011/0029364 A1 | 2/2011 | Roeding et al. |
| 2011/0178863 A1 | 7/2011 | Daigle |
| 2011/0179064 A1 | 7/2011 | Russo |
| 2011/0191438 A1 | 8/2011 | Huibers et al. |
| 2011/0238476 A1 | 9/2011 | Carr et al. |
| 2011/0276385 A1 | 11/2011 | Keller |
| 2011/0276419 A1 | 11/2011 | Johnson et al. |
| 2011/0302017 A1 | 12/2011 | Marti et al. |
| 2012/0047011 A1 | 2/2012 | Rippetoe et al. |
| 2012/0084210 A1 | 4/2012 | Farahmand |
| 2012/0089460 A1 | 4/2012 | Abhari et al. |
| 2012/0116861 A1 | 5/2012 | Dobyns |
| 2012/0191376 A1 | 7/2012 | Soles et al. |
| 2012/0315839 A1 * | 12/2012 | Mumcuoglu ......... H04W 4/029 |
| | | 455/2.01 |
| 2012/0329132 A1 | 12/2012 | Bloom et al. |
| 2013/0030875 A1 | 1/2013 | Lee et al. |
| 2013/0058796 A1 | 3/2013 | Gerz et al. |
| 2013/0144731 A1 | 6/2013 | Baldwin et al. |
| 2013/0210461 A1 * | 8/2013 | Moldavsky ........ G06Q 30/0267 |
| | | 455/456.3 |
| 2013/0268353 A1 | 10/2013 | Zeto et al. |
| 2013/0275198 A1 | 10/2013 | Zeto et al. |
| 2013/0297422 A1 | 11/2013 | Hunter et al. |
| 2014/0040014 A1 | 2/2014 | Anand et al. |
| 2014/0087752 A1 | 3/2014 | Zhu et al. |
| 2014/0143060 A1 | 5/2014 | Fernandez |
| 2014/0188658 A1 | 7/2014 | Li et al. |
| 2015/0206096 A1 | 7/2015 | Fernandez |
| 2015/0248666 A1 | 9/2015 | Williams et al. |
| 2016/0005020 A1 | 1/2016 | Fernando et al. |
| 2016/0012422 A1 | 1/2016 | Chitilian et al. |
| 2016/0024220 A1 | 1/2016 | Casimiro et al. |
| 2017/0178104 A1 | 6/2017 | Fernandez |
| 2017/0195339 A1 | 7/2017 | Brown |
| 2018/0150819 A1 | 5/2018 | Fernandez |
| 2019/0158353 A1 | 5/2019 | Johnson et al. |
| 2020/0065808 A1 | 2/2020 | Fernandez |

OTHER PUBLICATIONS

Discovering Bluetooth, Miller, Sybex, 2001, pp. 63-96; 247-258.*
BlueTooth Demystified, McGraw-Hill, 2001, pp. 2-396.*
Location-Based Services and Geo-Information Engineering, pp. 109-136; 200-201.*
The future of the internet—and how to stop It, Yale University Press, 2008, Chapter(s) 1-9, [emphasis pp. 11-18].*
Streetlights and Shadows, MIT Press, 2009, pp. 33-47.*
HCI remixed : reflections on works that have influenced the HCI community, MIT Press, 2008: pp. 275-279.*
Why a Diagram is (Sometimes) Worth Ten Thousand Words, Larkin, Simon, Cognitive Science, 1987, pp. 65-100.*
BlueTooth Application Developer's Guide, Kammer, Syngress Publishing, 2002, pp. 1-526.*
Yungeun Kim et al., Smartphone-Based Collaborative and Autonomous Radio Fingerprinting, IEEE Transactions on Systems, Man, and Cybernetics, Part C, Jan. 2012, 12 pages, vol. 42 Issue 1, IEEE.
Britannica Concise Encyclopedia, Encyclopedia Britannica, 2006, p. 537.
Cognition—From Memory to Creativity, Weisberg, Reeves, 2013, John Wiley & Sons, pp. 13-40, 519-527.
Computing the Mind, Shimon Edelman, Oxford University Press, 2008, pp. 26-31.
Creativity and Artificial Intelligence, Francisco Camara Pereira, Mouton de Gruyter, 2007, pp. 51-62.
Explaining Creativity, Keith Sawyer, 2006, Oxford University Press, pp. 104-105.
Ferrari, Wireless sensor networks: Performance and analysis in indoor scenarios, 2007.
Language and Mind, Chomsky, Oxford University Press, 2005, p. 62.
Mental Spaces, Gilles Fauconnier, Cambridge University Press, 1998, pp. xxviii-xxix.
Microsoft Computer Dictionary, Fifth Edition, 2002, Microsoft Press, p. 23.

(56) References Cited

OTHER PUBLICATIONS

Mind—A Brief Introduction, John R. Searle, 2004, Oxford University Press, pp. 62-67.
Noetics, Lawrence Krader, 2010, Peter Lang Publishing, pp. 551-553.
Oliveria, Wireless Sensor Networks: A Survey on Environmental Monitoring.
Robotics, Science and Systems III, Wolfram Burgard, Oliver Brock, and Cyril Stachniss, The MIT Press, 2008, pp. 41-48.
Sen, Dipankar, Prosenjit Sen, and Anand M. Das, RFID for energy & utility industries, 2009, Tulsa, Okla: PennWell, pp. 12-14 (Year: 2009).
The Way We Think, Fauconnier, 2010, Persues Books Group, Chapter 1, Chapter 13.
What is Thought, Eric Baum, The MIT Press, 2004, pp. 33-65.

\* cited by examiner

INTERACTIVE ADVERTISING USING PROXIMITY EVENTS

CROSS-REFERENCE TO RELATED APPLICATIONS

This application is a continuation-in-part of U.S. patent application Ser. No. 13/752,213, filed on Jan. 28, 2013 which claims priority to U.S. Provisional Patent Application Ser. No. 61/603,065, filed on Feb. 24, 2012.

BACKGROUND

Mobile devices (e.g., smart phones, tablets, personal computers, netbooks, etc.) are ubiquitous in society. Many consumers may carry, for example, a smart phone on their person when out in public. Such consumers may also use the smart phone to execute various applications (or "apps"). These consumers may also frequent various retail establishments such as grocery stores, clothing stores, restaurants, hotels, etc. In addition, such consumers may pass within a threshold proximity of various establishments and/or advertising elements (e.g., billboards, signs, etc.).

Many advertisers may wish collect data regarding traffic by, through, or near the establishment or advertising element. Such data collection may typically be done using limited methods such as surveying a sample of consumers, measuring traffic through a larger area (e.g., a mall, a shop, etc.). Such data collection may be limited by the accuracy of responses, resources available to tabulate the data, and/or other factors. In addition, such data may not be available in real-time or near real-time.

Thus there is a need for a solution that allows various establishments to automatically collect data regarding potential or existing customers with a mobile device, where the data collected is based on the proximity of each customer to a particular location or element and the collected data may be accessed by various third parties.

BRIEF SUMMARY

Some embodiments may provide a way for sellers and/or marketers to reach consumers based on a consumer's proximity to a particular location. Such a particular location may be defined by a sensor that emits a beacon signal in one or more directions within a defined range. The beacon signal may be received by a user device. Such a user device may execute a client application that communicates with a server application. Such communication may involve sending data and/or commands to and/or from each application. In some embodiments, the client application may be adapted to automatically perform various operations based at least partly on commands received from the server application.

Some embodiments may provide a way to collect location information. A sensor that emits a beacon signal may be attached to a person, pet, or moveable object. Various user devices may receive the beacon signal. Such user devices may include features that allow each user device to ascertain its own location. Each user device that is able to ascertain a location when receiving the beacon signal may send the information to a server application that is able to collect various locations associated with a particular sensor. The server application may be able to track or locate the sensor based at least partly on the collected data.

Alternatively, in some embodiments the location of the sensor (and thus the user device) may be determined using a database accessible to the server application. Such a database may include stored location information associated with each sensor in the database. Such stored location information may be provided by, for instance, a user (e.g., a retailer placing a sensor in a store may upload to the database a location of the store and an ID of the sensor), user devices that have previously perceived the sensor and provided a location, etc.

Some embodiments may provide an interactive advertising medium (e.g., a billboard, digital signage, etc.). Such a medium may communicate with an associated sensor of some embodiments. Such a sensor may be adapted to transmit to and collect data from various user devices that pass within a threshold distance or proximity of the sensor. The sensor may be adapted to communicate with the user devices to send and/or retrieve mobile content and/or to complete a commercial transaction with an advertiser associated with the advertising medium. The sensor may collect data regarding mobile devices that pass within a threshold distance and send the collected data to the server of some embodiments. Such data may be made available advertisers via one or more network-accessible databases.

A first exemplary embodiment provides a proximity sensor adapted to collect consumer location information. The proximity sensor includes: a detection module adapted to detect a user device within a threshold distance of the proximity sensor; a receiver adapted to collect data regarding the user device; and a communication interface adapted to allow the proximity sensor to send the collected data to a remote server.

A second exemplary embodiment provides an advertising system. The advertising system includes: an advertising medium adapted to provide interactive advertising content to users via a multimedia output; a proximity sensor adapted to detect and communicate with user devices that pass within a threshold distance of the advertising medium; and a remote server adapted to communicate with the proximity sensor and to provide advertising content to the advertising medium.

A third exemplary embodiment provides an interactive advertising device. The interactive advertising device includes: a proximity sensor adapted to detect and communicate with user devices that pass within a threshold distance of the advertising display; and a display element adapted to display an advertising content element from among a set of advertising content elements.

The preceding Summary is intended to serve as a brief introduction to some embodiments of the invention. It is not meant to be an introduction or overview of all inventive subject matter disclosed in this document. The Detailed Description that follows and the Drawings (or "Figures" or "FIGS.") that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matter is not to be limited by the illustrative details in the Summary, Detailed Description and the Drawings, but rather is to be defined by the appended claims, because the claimed subject matter may be embodied in other specific forms without departing from the spirit of the invention.

BRIEF DESCRIPTION OF THE DRAWINGS

The novel features of the invention are set forth in the appended claims. However, for purpose of explanation, several embodiments of the invention are set forth in the following drawings.

DETAILED DESCRIPTION

Figure 1:
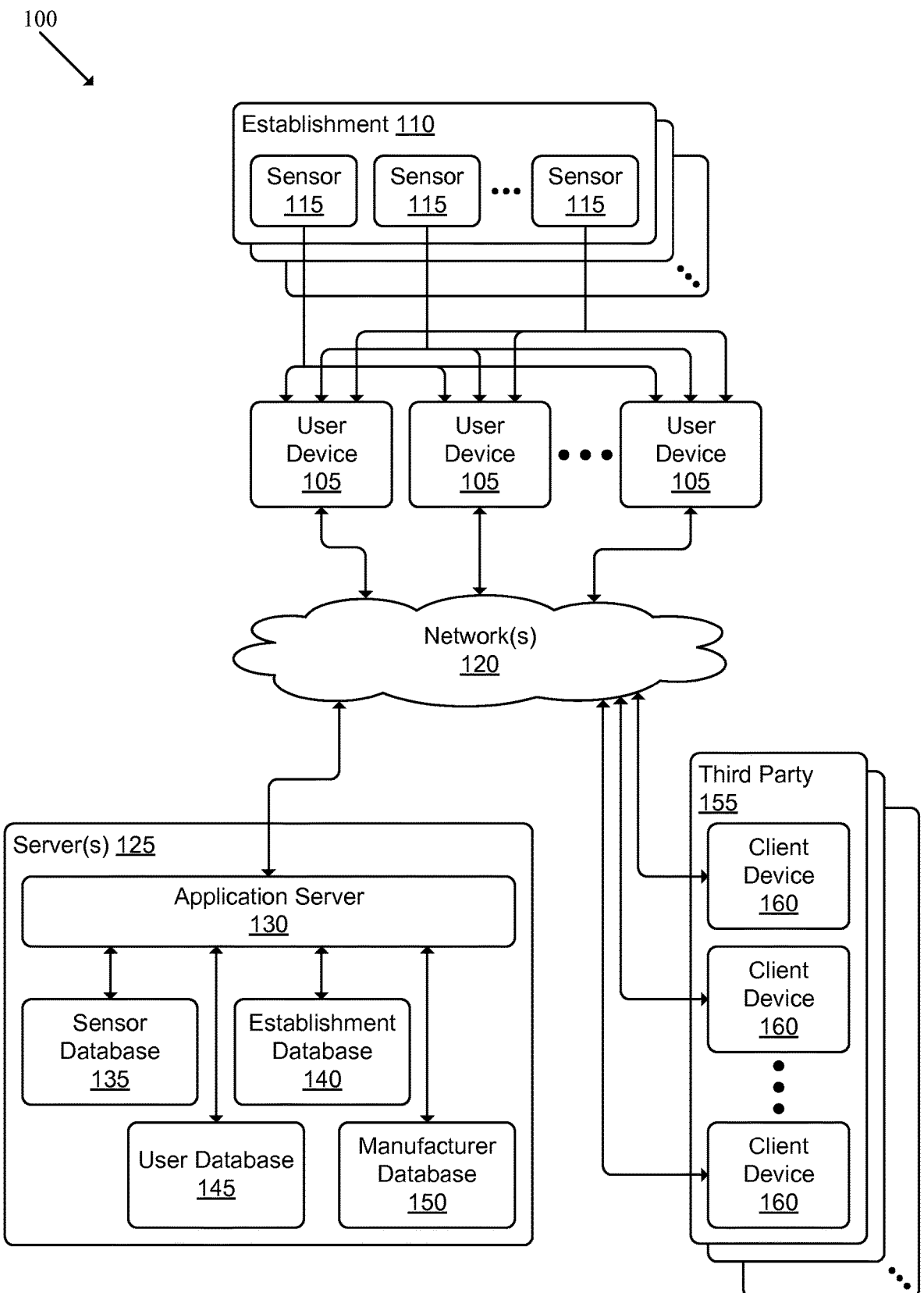
FIG. 1 illustrates a schematic block diagram of a conceptual proximity event system according to an exemplary embodiment of the invention.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Broadly, an embodiment of the present invention generally provides a way to monitor and respond to location information. Such location information may include the location of a sensor capable of providing a beacon signal. A mobile device (and/or other appropriate device) running an application may be able to determine whether the device is within a certain proximity of the sensor. When the application determines that the device is within the certain proximity of the sensor, the application may cause the device to communicate with a server. The server may receive information from the application (e.g., location of the device, ID of the sensor, etc.). Based on such information, the server may send sets of instructions to the application, where the sets of instructions may cause the mobile device to perform various operations (e.g., place a call, send a text message, display a marketing offer, etc.).

Some embodiments may include an apparatus and method whereby a mobile application running on a portable computing device such as a smartphone or tablet can react, according to instructions provided by a remote application running on a server computer, to the proximity of a wireless sensor that transmits low-power beacon signals to announce its presence at predetermined intervals.

Some embodiments may be able to control behavior of a mobile application when the portable device running the application comes within a proximity threshold of a stand-alone wireless sensor.

Some embodiments may include a method to provide targeted advertisement, such as coupons or sale offers to portable computing devices, such that the coupons and/or offers may be used by a mobile subscriber associated with the portable computing device.

Some embodiments may include a method to locate an untethered wireless sensor by its proximity to a portable computing device with more powerful location capabilities such as Global Positioning System (GPS) or a network-based locating capability. The sensor may be attached to an object, animal or person and hence its location may be unknown, but able to be determined using the portable computing device.

Several more detailed embodiments of the invention are described in the sections below. Section I provides a conceptual description of a system architecture used by some embodiments. Section II then describes various conceptual software architectures used by some embodiments. Next, Section III describes various methods of operation used by some embodiments. Section IV then describes various use cases that may be implemented using some embodiments.

Next, Section V describes a process used to define various applications of some embodiments. Lastly, Section VI describes a computer system which implements some of the embodiments of the invention.

I. System Architecture

FIG. 1 illustrates a schematic block diagram of a conceptual system 100 according to an exemplary embodiment of the invention. Specifically, this figure shows various communication pathways among the elements of the system 100. As shown, the system may include one or more user devices 105, one or more establishments 110, each including one or more sensors 115, one or more networks 120, one or more servers 125, the servers providing an application server 130, a sensor database 135, an establishment database 140, a user database 145, and a manufacturer database 150, and one or more third parties 155, each third party including one or more client devices 160.

Each user device (or mobile device) 105 may be capable of communicating with one or more network(s) 120 and one or more sensors 115. In addition, each user device 105 may be able to provide information to a user and/or receive inputs from a user. Each user device may include one or more processors, memory, user interface elements, and/or other appropriate elements. Such a user device may be, for instance, a mobile phone, a tablet, a portable computer, etc. Each user device may include one or more display elements (e.g., a screen, indication lights, etc.) and various user input elements (e.g., a keypad, touchscreen, etc.).

Each establishment 110 may be a retail establishment (e.g., a store, restaurant, etc.), a building (e.g., a museum, library, etc.), or some defined area (e.g., a parking lot, a sports field, etc.). Each establishment may have one or more sensors 115 placed so as to define one or more zones associated with the establishment.

Each sensor 115 may include various wireless communication features. Such wireless communication features may include radio frequency communication features and may use various appropriate formats (e.g., Bluetooth, WiFi, etc.). The sensors may be able to transmit a beacon signal that is able to be received by a user device 105. The beacon signal may include a unique sensor identifier (or "sensor ID") and may be transmitted using short-range radio frequency signals at preset intervals. The sensor 115 will be described in more detail in reference to FIGS. 3-6 below. In some embodiments, a sensor 115 may be attached to, for instance, an object, pet, person, etc.

The network(s) 120 may include one or more local-area networks (e.g., a wireless network, an Ethernet network, etc.), wide-area networks and/or networks of networks (e.g., the Internet). The networks may allow data and/or instructions to be passed among the various components of the system.

The server(s) 125 may include one or more electronic devices that are able to execute instructions and/or process data. The application server 130 may be able to pass data and/or instructions among one or more databases 135-150 and/or one or more network(s) 120. The databases 135-150 may be able to store data and/or instructions. Various example data structures will be described in reference to FIG. 12 below.

Each third party 155 may be a non-consumer individual or entity that accesses the system 100. Such entities may include, for example, retail chains, product manufacturers, application developers, etc. Each third party 155 may include one or more client devices 160 that may allow the third party 155 to access system 100 through network(s) 120. Such a client device 160 may be, for instance, a personal computer, a notebook computer, a mobile phone, etc.

During operation, a user device 105 that moves within a particular proximity of a sensor 115 may receive a beacon signal from the sensor. The user device may then execute a client-side application that allows the user device to send data and/or instructions to the server(s) 125 via the network 120. Such data and instructions may include information regarding the proximity event (e.g., an identifier of the sensor). The server(s) 125 may process the received data and/or instructions and determine various potential responses. Such responses may be based at least partly on the location of the sensor 115, an establishment 110 associated with the sensor, a third party 155 associated with the sensors, and/or other relevant factors. The server(s) 125 may determine such responses based on information stored, for instance, the sensor database 135, the establishment database 140, the user database 145, and/or the manufacturer database 150. The server(s) 125 may then send one or more responses to the user device (e.g., a coupon, sale offer, product information, etc.). The user device 105 may receive the response(s) from the server(s) and provide them to a user. Alternatively, the user device may execute various actions based on the received response(s). For instance, such actions may include making a phone call, sending a text message, playing a sound, displaying an image, determining a current position via the global positioning system (GPS) or other appropriate ways (e.g., by determining a location of a cell tower used by the user device, the location of a Femtocell, Microcell or other communications system associated with the user device, etc.), etc.

Each client device 160 may allow a third party 155 to send data and/or instructions to the server(s) 125 via the network 120. Such data and/or instructions may include sensor data, establishment data, manufacturer data, and/or other data. The server(s) 125 may process the received data and/or instructions and provide various responses (e.g. an update confirmation message, an action required message, etc.) to the third party 155 through the client device 160.

One of ordinary skill in the art will recognize that the system 100 is conceptual in nature and may be implemented in various different ways without departing from the spirit of the invention. For instance, various elements may be removed and/or various other elements may be included. In addition, multiple elements may be combined into a single element and/or a single element may be divided into multiple elements. Furthermore, various other communication pathways may be utilized and/or included.

Figure 2:
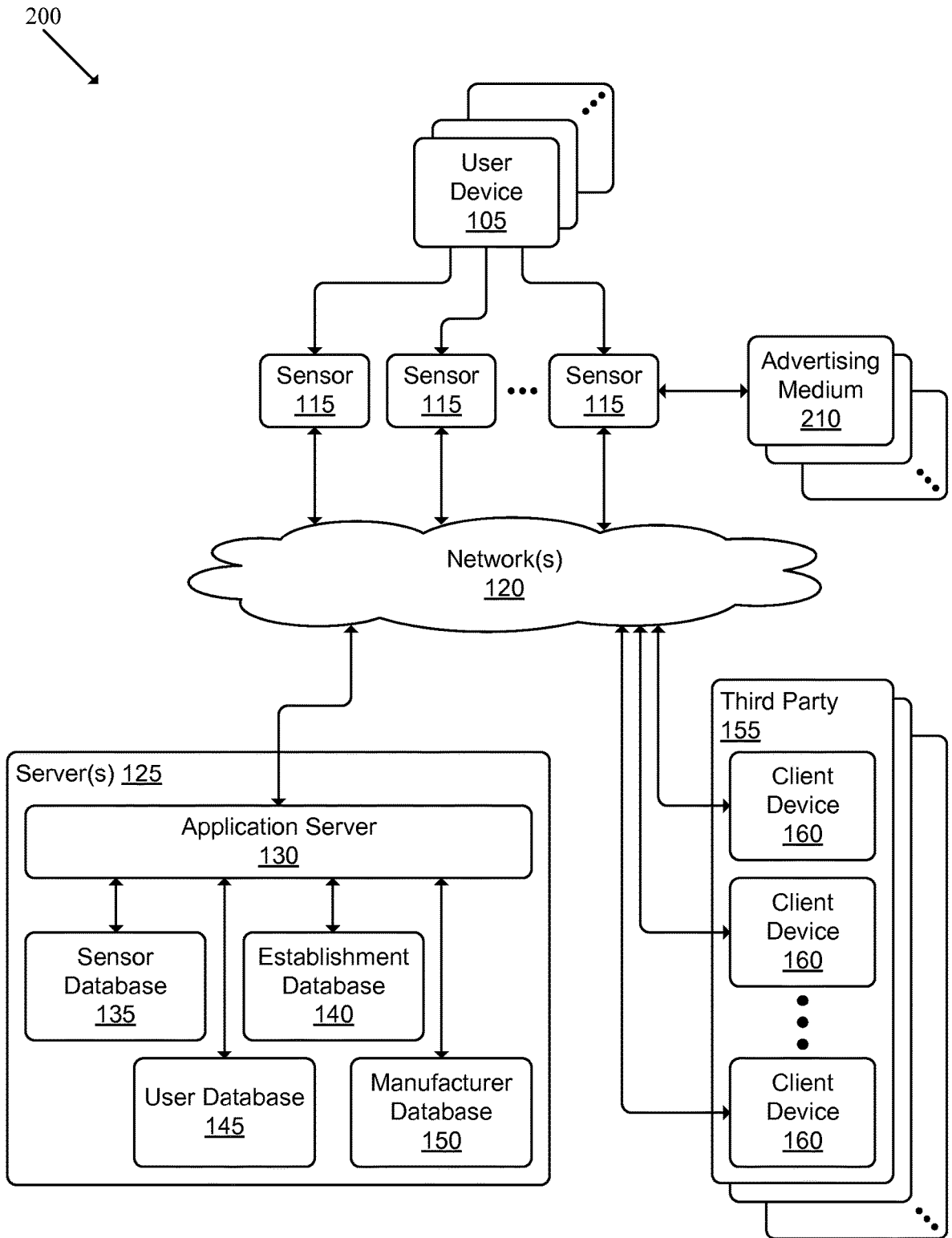
FIG. 2 illustrates a schematic block diagram of a conceptual system implemented using an alternative configuration of elements of some embodiments of the system of FIG. 1.

FIG. 2 illustrates a schematic block diagram of a conceptual system 200 implemented using an alternative configuration of elements of some embodiments of system 100. Specifically, this figure shows various communication pathways among the elements of the system 200. As shown, in addition to any components described above in reference to system 100, system 200 may include various advertising mediums 210.

During operation, each sensor 115 may collect information from user devices 105 that pass within a proximity threshold of the sensor 115. Such information may be transmitted via network 120 to the server 125 for storage and/or analysis. The transmitted data (or elements thereof) may be made available to the third parties 155 via network 120.

In addition, each sensor 115 may communicate with one or more advertising mediums 210. In some embodiments, each sensor 115 may be embedded in (or otherwise attached to) a medium 210. Each medium may be a billboard, video screen, multimedia display, and/or other appropriate devices and/or systems associated with presenting advertising content. Such communication may occur using various appropriate pathways (e.g., wired connections, wireless connections, network connections, etc.). In this way, each sensor 115 may at least partially control (and/or provide) the content present by one or more advertising mediums 210. Furthermore, as above, each sensor 115 may be able to communicate with the server 125 via one or more networks 120 in order to send and/or receive data related to the advertising content, mobile devices within a proximity threshold, and/or other appropriate information.

In some embodiments, each sensor 115 may communicate with the server 125 and, based on the sensor ID, retrieve mobile content and/or complete a transaction with a third-party advertiser associated with the advertising medium 210. In some embodiments, the medium may be able to communicate with the server 125 and/or third-party servers 155, where data sent to the medium may be based at least partly on data received from and/or associated with the sensor 115.

In some embodiments, a sensor 115 may be associated with non-interactive advertising mediums 210 (e.g., posters, product displays, etc.). The sensor 115 may be associated with non-advertising elements (not shown) such as, for example, product packaging or a product itself, artwork, etc. Such sensors may be adapted to collect user data and relay such data to a server 125 and/or to allow users to access information (and/or receive marketing offers) related to advertised items, displayed products, etc. Such information may be accessed using a mobile device application of some embodiments.

The operation of system 200 will be described in more detail in reference to FIGS. 15-16 below.

One of ordinary skill in the art will recognize that the system 200 is conceptual in nature and may be implemented in various different ways without departing from the spirit of the invention. For instance, various elements may be removed and/or various other elements may be included. In addition, multiple elements may be combined into a single element and/or a single element may be divided into multiple elements. Furthermore, various other communication pathways may be utilized and/or included.

Figure 3:
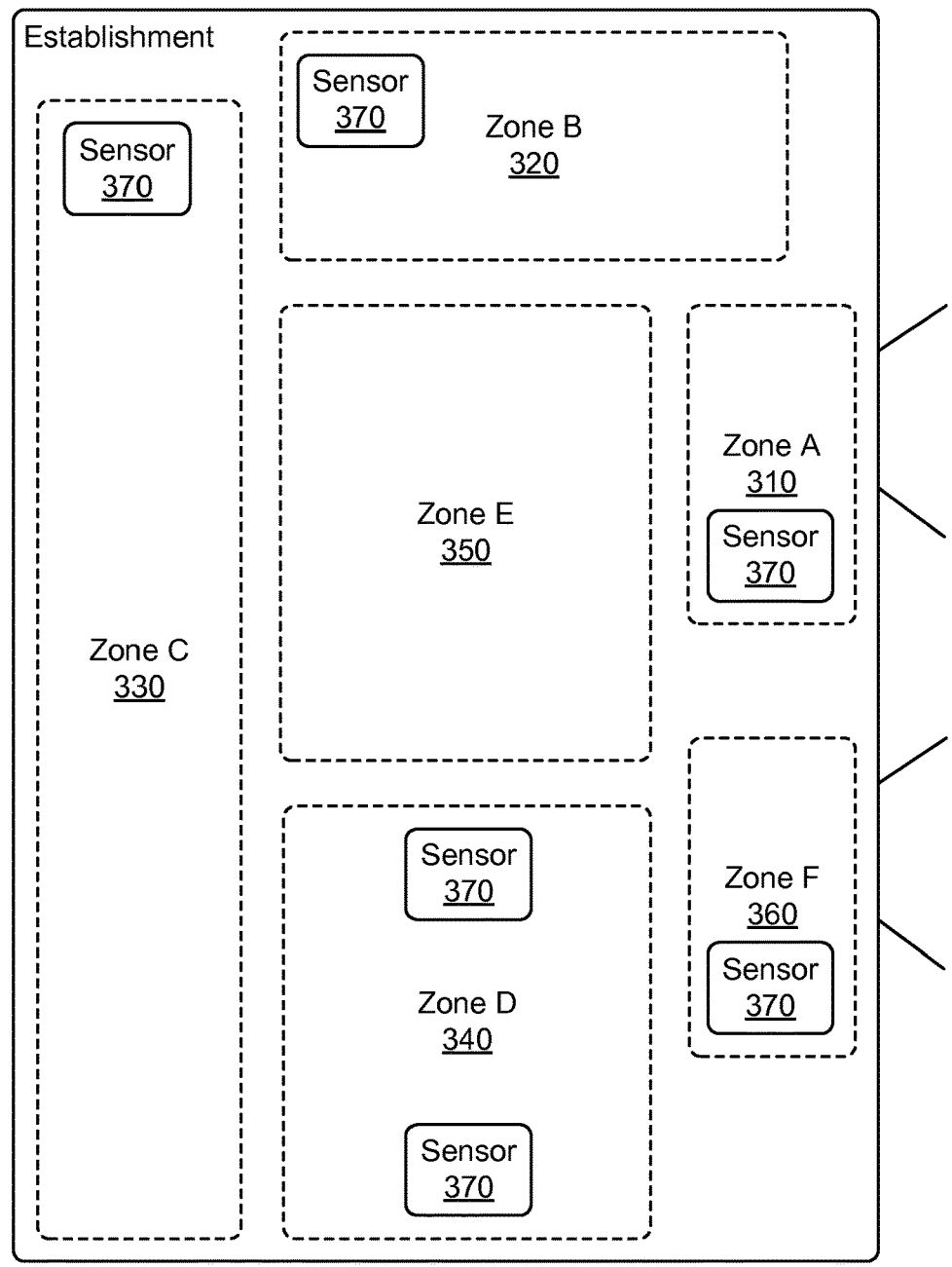
FIG. 3 illustrates a floor plan of an establishment included in some embodiments of the system of FIG. 1.

FIG. 3 illustrates a floor plan of an establishment 300 included in some embodiments of the system 100. Specifically, this figure shows how an establishment may be divided into multiple sections (or "zones") that may each use one or more sensors to identify proximity events. As shown, the establishment 300 may include multiple zones 310-360, each of which may include one or more sensors 370. The sensor location(s) may be configured in various different ways, as appropriate. Each sensor may be associated with a set of advertising mediums (not shown).

In the example of FIG. 3, a first zone 310 may be defined at an entrance of the establishment such that consumers entering the establishment 300 may trigger a proximity event. In this example, a number of product zones 320-340 may be defined such that a consumer may trigger a proximity event when a user device is able to detect the beacon signal of a sensor 270 located relative to the zone. Product zone 340 may include multiple sensors 370 such that the zone is defined as multiple sub-zones, and/or so that an array of proximity events may be determined (e.g., a user application may determine that the user is within a certain proximity of a first sensor, a second sensor, or both a first and second sensor). Zone 350 may define an "inactive" area where no proximity events are generated (e.g., an area of the establishment 300 used only by employees). Finally, zone 360 may be defined at an exit of the establishment such that consumers leaving the establishment 360 may trigger a proximity event.

During operation, a particular consumer-user may have a mobile application running on a user device. The consumer-user may then enter establishment 300 through the entrance 310, generating a proximity event. The event may cause the mobile application to send a notification of the event to a remote server, which in turn may cause the mobile application to perform an action. Such an action may include, for instance, retrieving and displaying a shopping list for the establishment, offering a generic (or user-specific) coupon, provide information regarding sale items, and/or other appropriate actions.

The consumer may then enter a first product zone 320, triggering another proximity event. In this example, the zone 320 may be a deli and the user's shopping list may indicate that the user wishes to buy a half pound of sliced ham. Thus, the proximity event may be used to provide an offer related to ham, display ham that is on sale, display other specials in the deli section, and/or other appropriate actions. The consumer-user may proceed through the establishment in a similar fashion, potentially triggering proximity events related to other zones within the establishment.

After the consumer-user has finished shopping and paid for any items, the user may leave the establishment through the exit 360, triggering a proximity event. In response to such an event, various appropriate actions may be performed, such as displaying a message on the user's mobile device (e.g., "Thank you for shopping with us!").

Proximity events may, in addition to, or in place of, interacting with a consumer or other user, cause data to be generated and stored in a way that is transparent to the user. Such data may be sent to the server and stored remotely. Alternatively, data associated with the user may be stored locally on the user's mobile device. For instance, stored data relating to proximity events may be used to calculate the average time a user spends in an establishment or zone.

One of ordinary skill in the art will recognize that the establishment 300 and associated floor plan and sensor configuration are presented for example purposes only. Different embodiments may include differently configured establishments with differently configured floor plans. In addition, the configuration (and/or number) of sensors located within each establishment may be altered as appropriate.

Figure 4:
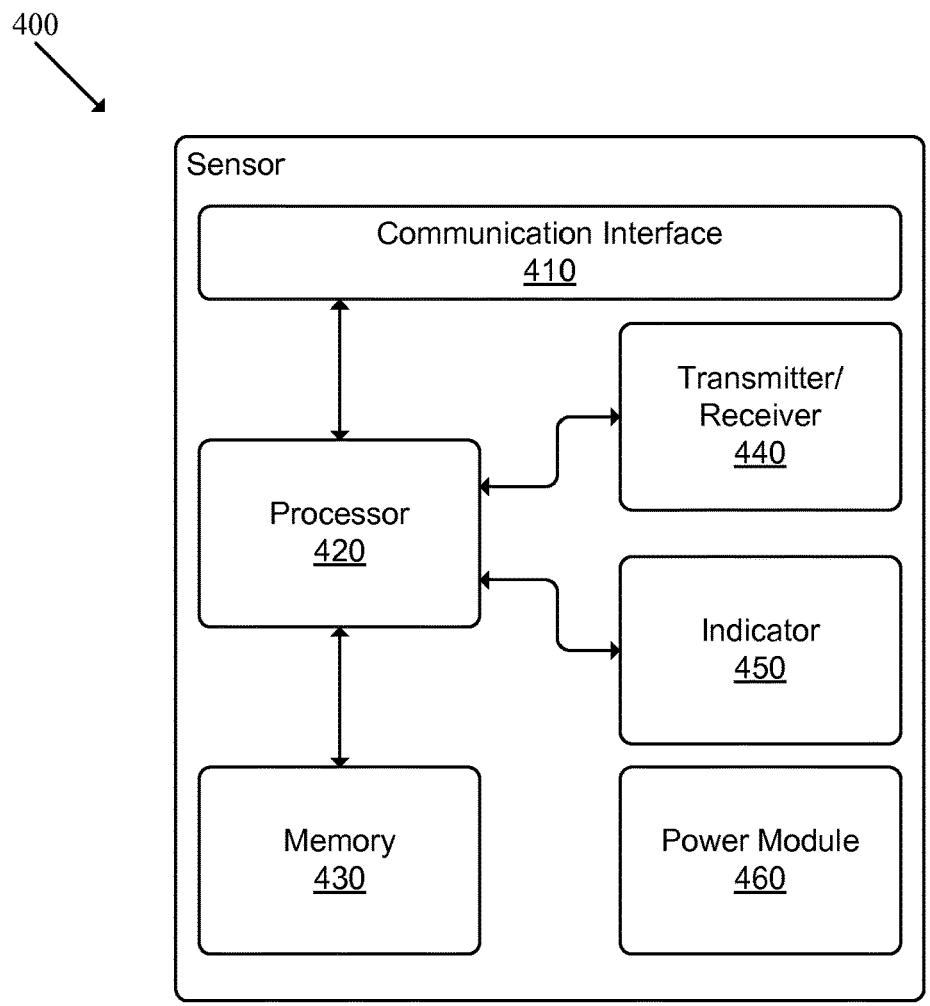
FIG. 4 illustrates a schematic block diagram of a sensor used by some embodiments of the system of FIG. 1.

FIG. 4 illustrates a schematic block diagram of a sensor 400 used by some embodiments of the system 100. Specifically, this figure shows the various components that may be included in the sensor 400 of some embodiments. As shown, the sensor device 400 may include a communication interface 410, a processor 420, a memory 430, a transmitter/receiver 440, one or more indicators 450, and/or a power module 460.

The communication interface 410 may be adapted to allow a client device (e.g., a PC, a smart phone, etc.) to communicate with the sensor 400 (or vice-versa). The communication interface 410 may include various wired and/or wireless connections (e.g., a universal serial bus (USB) port, a Bluetooth or other wireless port, etc.).

The communication interface may be adapted to allow two-way communication among the sensor and various other devices and/or connections (e.g., between the sensor and a mobile device via a Bluetooth connection, between the sensor and a server across a network or set of networks, between a first sensor and a second sensor, etc.).

The communication interface may be adapted to allow users to adjust settings of the sensor (e.g., beacon signal range, direction, interval time, etc.). In some embodiments, the sensor 400 may be configured when manufactured. In some of these embodiments, the sensor may be configured to run firmware. Such firmware may allow the sensor to continuously operate when power is provided. The firmware may be adapted to cause the sensor continuously or periodically perform various operations (e.g., transmit a beacon signal, react to events, etc.). The sensor attributes may then be configured at the server (e.g., range and spread of the beacon signal, pattern of the signal, definition of events and responses, etc.). Alternatively, various configuration parameters may be defined and/or updated as the sensor operates.

The processor 420 may be adapted to process instructions and/or data. In addition, the processor may be adapted to allow communication among the various other modules of the sensor 400.

The memory 430 may be adapted to store various instructions and/or data used by the sensor 400. Such instruction may include firmware instructions, logical operations, and/or other appropriate instructions. The data may include, for instance, an identifier of the sensor, attributes of the sensor performance (e.g., range and spread of the beacon signal, interval between signals, etc.), and/or other information.

The transmitter/receiver 440 may be adapted to transmit various types of beacon signals (e.g., WiFi, Bluetooth (classic, low energy (LE) (e.g., "Bluetooth Smart Ready", "Bluetooth Smart", etc.), Bluetooth v4.0, etc.), etc.) using various different communications protocols (e.g., cellular (e.g., 2G, 3G, 4G LTE, etc.), ZigBee protocol, ANT, ANT+, etc.). The transmitter may be configurable, such that the range and spread of the transmitted signal(s) may be controlled (e.g., by loading values to the sensor memory 430, by defining various attributes at the server, etc.).

In some embodiments, the range, spread, and/or other attributes of the beacon signal may be adjusted at run-time by a client application (e.g., by adjusting a threshold received power used to trigger an event). Such "dynamic range" may be used to allow various sellers (e.g., manufacturers of particular brands) to bid for placement in real-time. For instance, multiple brands of a particular product may be perceived as each being the same distance (or matched to within a particular threshold) from a consumer. In some cases, an order of the items presented may correspond at least partly to various bid amounts associated with sellers of the products (rather than being determined solely based on proximity).

In addition, the transmitter/receiver 440 of some embodiments may be adapted to receive various types of signals and/or communications. The receiver may communicate with other devices via similar protocols to those used by the transmitter. In some embodiments, one or more transmitters and/or one or more receivers may share elements of the sensor (e.g., an antenna, communication circuitry, etc.). The operation of the receiver (and/or transmitter) may be configurable in some embodiments (e.g., Bluetooth communications may be able to be enabled/disabled, communication power and/or frequency may be adjusted, etc.).

Some embodiments may include multiple transmitter/receivers 440 (and/or multiple transmitters and/or receivers). Each transmitter/receiver may be associated with a particular external element or elements (e.g., user devices, a remote server, an advertising medium, etc.).

The indicator(s) 450 may be adapted to provide a visual indication of the status of the sensor. The indicator(s) may include various display elements (e.g., differently-colored lights, a set of LEDs, etc.). The indicator(s) may allow a user to determine a current state of the sensor (e.g., "off", "on", "transmitting", "error", etc.). In some embodiments, the indicator(s) may provide other than visual indications (e.g., one or more sound indicators, message(s) delivered to a client device, etc.).

In some embodiments, the sensor 400 may include a detection module (not shown) that may allow the sensor to determine when a user device is within a threshold distance of the sensor. Such detection may be based at least partly on received signal strength (e.g., a Bluetooth signal, cellular signal, etc.), data received from a remote server, and/or other appropriate parameters.

One of ordinary skill in the art will recognize that the sensor 400 is conceptual in nature and may be implemented in various different ways without departing from the spirit of the invention. For instance, various elements may be removed and/or various other elements may be included. In addition, multiple elements may be combined into a single element and/or a single element may be divided into multiple elements. Furthermore, various other communication pathways may be utilized and/or included.

Figure 5:
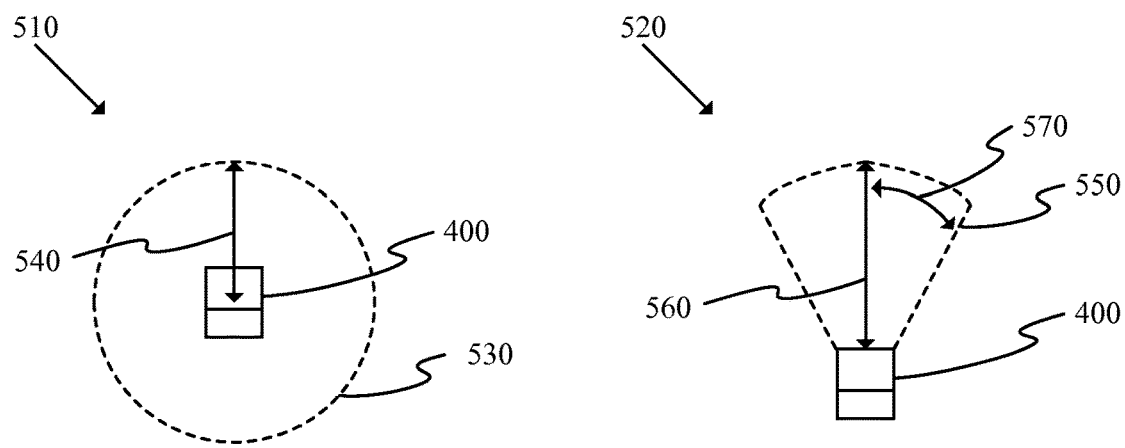
FIG. 5 illustrates top views of the sensor of FIG. 4, showing proximity zones defined by various beacon signals that may be provided by some embodiments of the sensor.

FIG. 5 illustrates top views 510-520 of the sensor 400, showing proximity zones defined by various beacon signals that may be provided by some embodiments of the sensor 400. Specifically, this figure illustrates several example areas that may be defined by setting various beacon signal attributes (e.g., range, direction, and/or spread). As shown, in a first configuration 510, the signal area 530 is omni-directional and the signal range is defined by radius 540. In a second configuration 520, the signal area 550 is defined by a range 560 and spread angle 570.

In some embodiments, the primary direction of the signal (i.e., the signal direction with a minimum spread angle) in the second configuration 520 may be selectable (e.g., the primary direction may be a defined value, such as an angle, relative to various physical attributes of the sensor 400). In some other embodiments, the primary direction of the signal in the second configuration may be pre-set in relation to physical attributes of the sensor (e.g., the sensor may be adapted to mount to a wall and the primary direction of the signal may be set to emanate in a direction perpendicular to and away from the wall).

The shape, direction, range, and/or other attributes of the beacon signal may be defined in various different ways to achieve various different optimizations. For instance, in some embodiments a user of the sensor 400 may wish to generate a signal area that covers the most possible physical space. Such a user may select an omni-directional signal with a maximum range allowed by the sensor. As another example, a user of the sensor may wish to minimize power used by the sensor and thus may define a signal area with limited range and spread.

One of ordinary skill in the art will recognize that the signal areas 530 and 550 are conceptual in nature and may be implemented in various different ways without departing from the spirit of the invention. For instance, the areas may be defined by various different shapes with various specific attributes.

Figure 6:
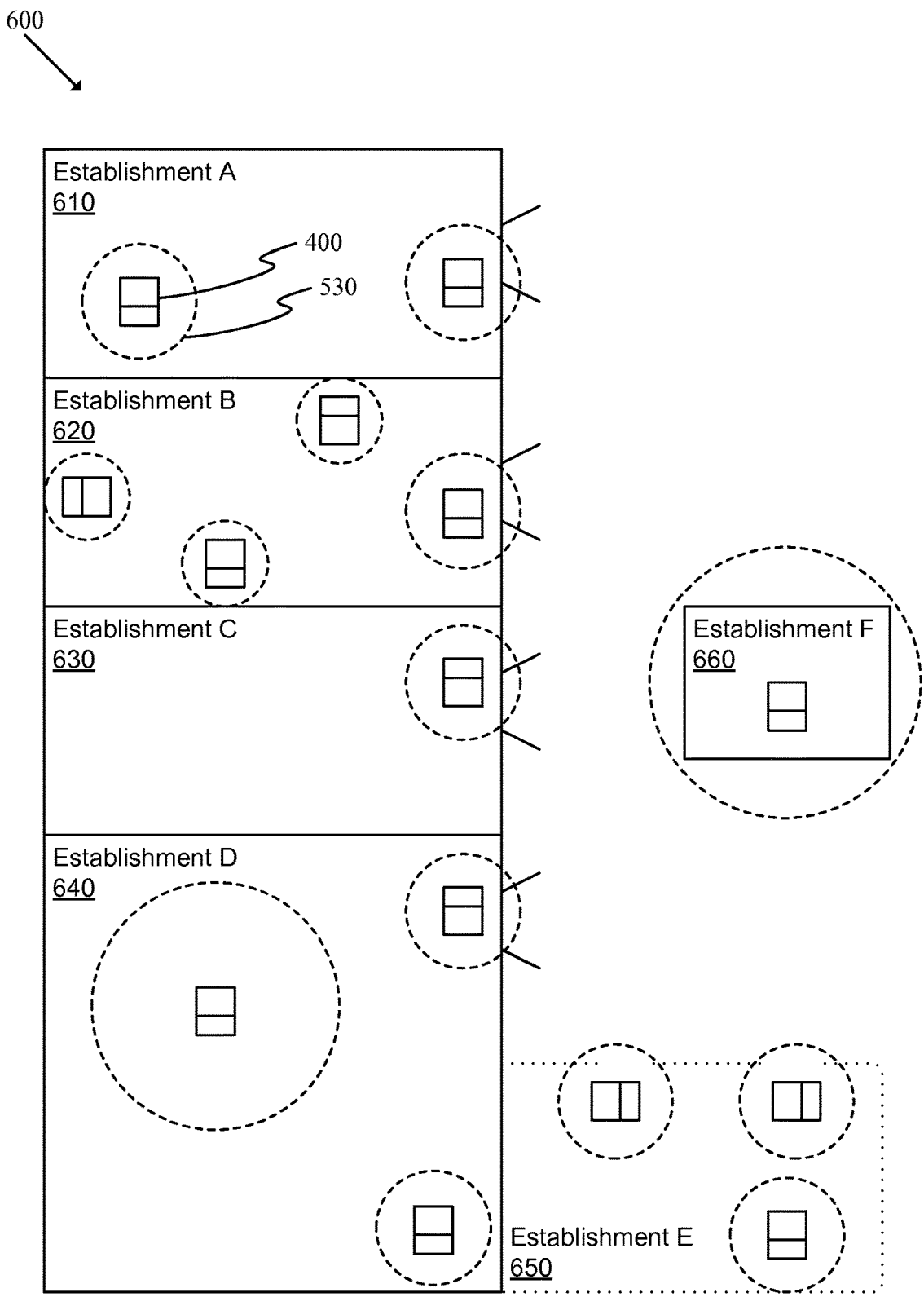
FIG. 6 illustrates a floor plan of a multi-sensor, multi-establishment implementation according to some embodiments of the system of FIG. 1.

FIG. 6 illustrates a floor plan of a multi-sensor, multi-establishment implementation 600 according to some embodiments of the system 100. Specifically, this figure illustrates multiple sensors 400, each configured to provide an omni-directional beacon signal area 520, positioned at example locations throughout the implementation 600.

As shown, the multi-sensor implementation 600 may include one or more establishments 610-660, each establishment including one or more sensors 400. One of ordinary skill in the art would recognize that one or more establishments may not include any sensors (not shown in this example). In addition, one of ordinary skill in the art would recognize that various ranges, directions, and spread of signals may be used, as described above in reference to FIG. 5.

In the example of FIG. 6, a first establishment 610 may include a sensor 400 located near an entrance and another sensor 400 located within the establishment 610. A second establishment 620 may include multiple sensors 400 placed at various locations throughout the establishment 620. A third establishment 630 may have only one sensor 400 located in the establishment 630. A fourth location 640 may include multiple sensors 400, where one sensor is configured to have a much greater beacon signal range 520 than the other sensors 400. A fifth establishment 650 may include multiple entryways/exitways, each associated with a sensor 300, and another sensor located within the establishment 650. In this example, the fifth establishment 650 may be an open area (e.g., a section of a parking area, field, etc.) and/or be at least partly defined by a temporary structure (e.g., a cover, tent, set of display tables, etc.). A sixth establishment 660 may be an outdoor booth or cart with a single sensor 400 that defines an area that includes locations outside the boundaries of the booth or cart.

One of ordinary skill in the art will recognize that schematic diagram of a multi-sensor configuration 600 is conceptual in nature and may be implemented in various different ways without departing from the spirit of the invention. For instance, different establishments or groups of establishments may have different shapes, floor plans, etc.

II. Software Architecture

Figure 7:
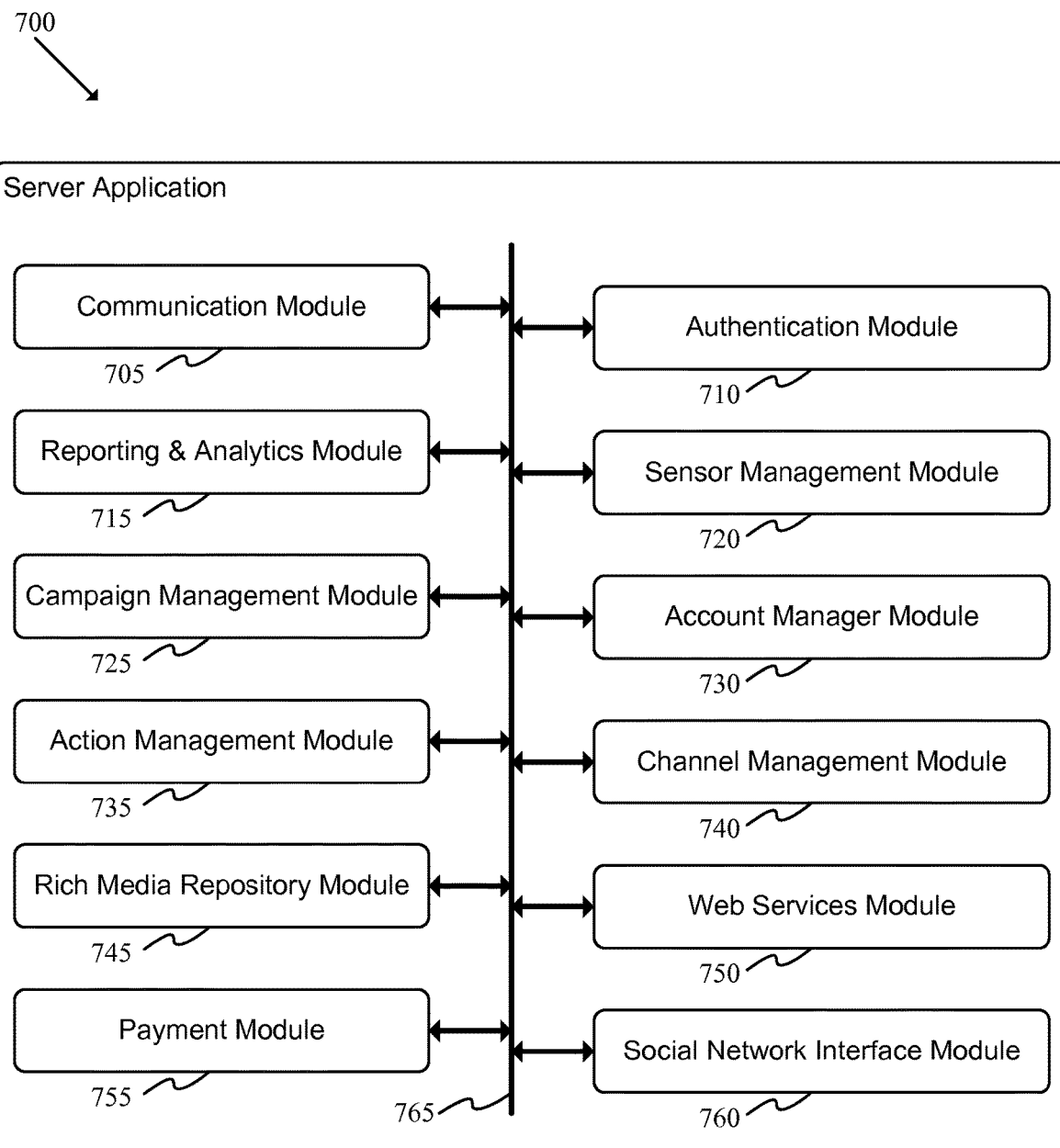
FIG. 7 illustrates a schematic block diagram of a conceptual server application provided by some embodiments of the invention.

FIG. 7 illustrates a schematic block diagram of a conceptual server application 700 provided by some embodiments of the invention. Specifically, this figure shows various system components that may be provided by the server (or server-side) application. Such a server-side application may be executed by one or more appropriate user devices. As shown, the server application may include a communication module 705, an authentication module 710, a reporting & analytics module 715, a sensor management module 720, a campaign management module 725, an account manager module 730, an action management module 735, a channel management module 740, a rich media repository module 745, a web services module 750, a payment module 755, a social network interface module 760, and/or a communications bus 765.

The communication module 705 may be adapted to communicate with various client devices, typically across one or more networks. The authentication module 710 may be adapted to confirm and/or validate user account information (e.g., a login name and password) supplied by a user (e.g., a consumer, an establishment-user, a manufacturer-user, etc.). The reporting and analytics module 715 may be adapted to perform various analyses and reporting of collected data. Such a module may be used to generate reports, produce charts and/or export data that can be analyzed by and/or integrated into third-party systems. The sensor management module 720 may be adapted to control and manage the sensors used by some embodiments (e.g., by defining events, ranges, etc.).

In some embodiments, the reporting and analytics module 715 may be adapted to collect data from various sources. Such data may be collected from, for instance, user devices, sensors, third-party servers, etc. The data may include marketing information, user activity information, sales information, order information, and/or other appropriate data that may be useful in association with proximity events.

The campaign management module 725 may be adapted to allow management of marketing campaigns. The account manager module 730 may be adapted to allow management of various accounts (e.g., consumer-user, establishment-user, manufacturer-user, etc.). The action management module 735 may be adapted to create, configure and associate events with corresponding sensors. The channel management module 740 may be adapted to customize advertisements, marketing messages and application events based on a device's capabilities and methods of connection. The rich media repository module 745 may be adapted to provide and store rich media resources. The web services module 750 may be adapted to configure the user/client information and settings via various webpages.

The payment module 755 may be adapted to process invoice, billing, and/or payment information in various appropriate ways. Such a module may be able to generate (or receive from another source) a list of goods and/or services associated with a consumer and generate an invoice (or other appropriate way of requesting a payment from the consumer). The module may further receive payment information from a consumer (e.g., via a credit card swiping element, by providing an entry form, by receiving the information from an application associated with the consumer, etc.). In addition, the module may communicate with various external resources to verify the payment information and authorize payment (e.g., by sending a request to a third party to process a credit card transaction, receiving confirmation back from a third party, etc.).

The social network interface module 760 may be adapted to interact with various third-party social networks. Such networks may be accessed through various combinations of networks (e.g., the Internet), interfaces (e.g., one or more APIs), and/or other elements. Such a social network interface may, for instance, allow a user to recommend (and/or receive recommendations regarding) an establishment, item, service, etc. to various other users that may be associated with a social network account of the user.

The bus 765 may be adapted to allow communication among the various other elements 705-760 of the server application 700.

The operation of the server application 700 will be described in more detail in reference to Section III below.

One of ordinary skill in the art will recognize that the server application 700 is conceptual in nature and may be implemented in various different ways without departing from the spirit of the invention. For instance, various elements may be removed and/or various other elements may be included. In addition, multiple elements may be combined into a single element and/or a single element may be divided into multiple elements. Furthermore, various other communication pathways may be utilized and/or included.

Figure 8:
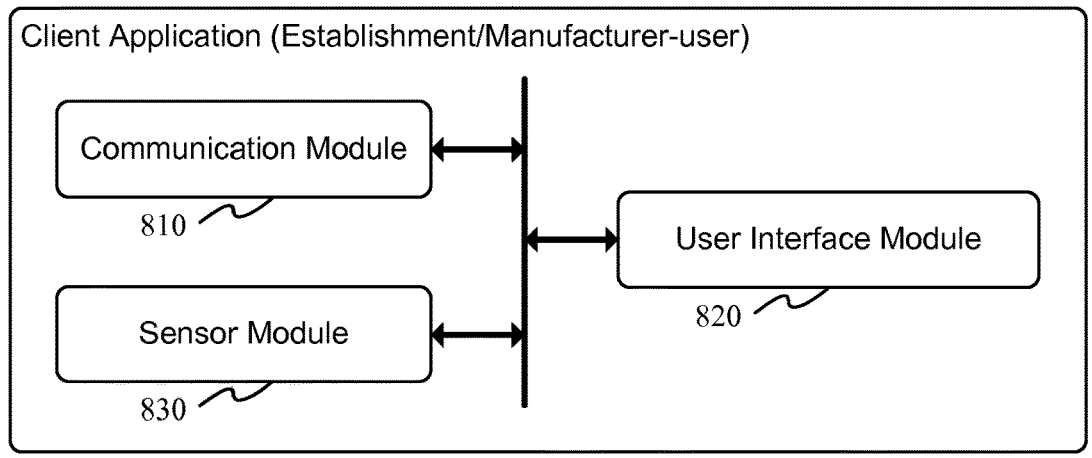
FIG. 8 illustrates a schematic block diagram of a conceptual user application provided by some embodiments of the invention.

FIG. 8 illustrates a schematic block diagram of a conceptual user application 800 provided by some embodiments of the invention. Specifically, this figure shows various system components that may be provided by the client (or client-side) application. Such a client-side application may be executed by an appropriate user device. As shown, the application may include a communication module 810, a user interface module 820, and/or a sensor module 830.

The communication module 810 may be adapted to communicate with various server devices, typically across one or more networks. In addition, the communication module may be adapted to communicate with one or more sensors of some embodiments (e.g., via a WiFi channel, a Bluetooth link, etc.). The communication module may also be adapted to communicate with one or more advertising mediums, and/or other external devices and/or systems.

The user interface module 820 may be adapted to provide outputs to a user and/or receive inputs from the user. The sensor module 830 may be adapted to configure, test, communicate with, and/or otherwise interact with one or more sensors of some embodiments.

One of ordinary skill in the art will recognize that the establishment-user and/or manufacturer-user application 800 is conceptual in nature and may be implemented in various different ways without departing from the spirit of the invention. For instance, various elements may be removed and/or various other elements may be included. In addition, multiple elements may be combined into a single element and/or a single element may be divided into multiple elements. Furthermore, various other communication pathways may be utilized and/or included.

Figure 9:
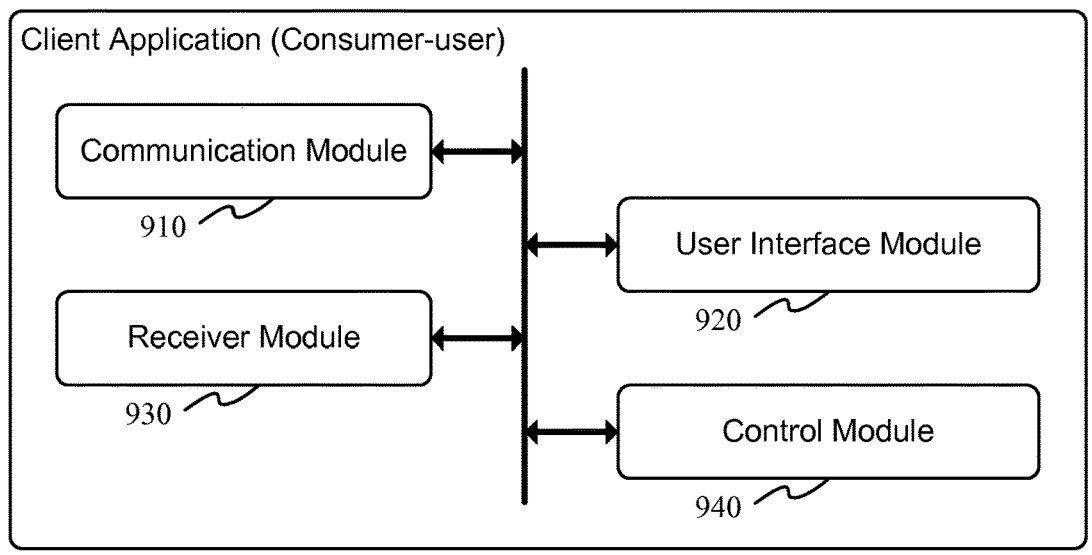
FIG. 9 illustrates a schematic block diagram of an alternative conceptual user application provided by some embodiments of the invention.

FIG. 9 illustrates a schematic block diagram of an alternative conceptual user application 900 provided by some embodiments of the invention. Specifically, this figure shows various system components that may be provided by the client (or client-side) application. Such an application may be executed by an appropriate user device (e.g., a smart phone, a tablet, etc.) and may use various resources provided by the user device (e.g., network connections, storages, GPS, etc.). As shown, the application may include a communication module 910, a user interface module 920, a receiver module 930, and/or a control module 940.

The communication module 910 may be adapted to communicate with various server devices, typically across one or more networks. In addition, the communication module may be adapted to communicate with one or more sensors of some embodiments (e.g., via a WiFi channel, a Bluetooth link, etc.). The communication module may also be adapted to communicate with one or more advertising mediums, and/or other external devices and/or systems.

The user interface module 920 may be adapted to provide outputs to a user and/or receive inputs from the user. The receiver module 930 may be adapted to receive beacon signals from the sensors of some embodiments. The control module 940 may be adapted to control various aspects of a user device (e.g., by causing the device to display a GUI, to send a text message, to place a phone call, to play a sound, etc.).

One of ordinary skill in the art will recognize that the consumer-user application 900 is conceptual in nature and may be implemented in various different ways without departing from the spirit of the invention. For instance, various elements may be removed and/or various other elements may be included. In addition, multiple elements may be combined into a single element and/or a single element may be divided into multiple elements. Furthermore, various other communication pathways may be utilized and/or included.

Figure 10:
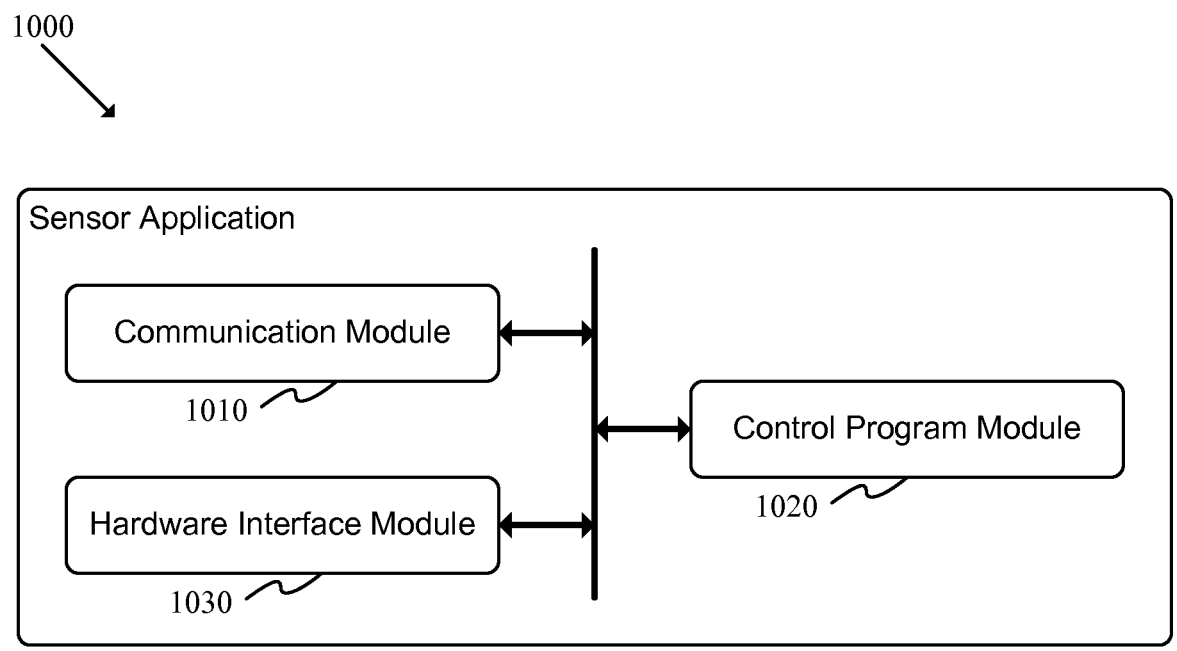
FIG. 10 illustrates a schematic block diagram of a sensor application provided by some embodiments.

FIG. 10 illustrates a schematic block diagram of a sensor application 1000 provided by some embodiments of the invention. Specifically, this figure shows various system components that may be provided by the sensor application. The combination of sensor software and memory described above in reference to FIG. 4 may provide a firmware solution for controlling the operation of a sensor. Such an application 1000 may be executed by an appropriate sensor device (e.g., sensor 400) and may use various resources provided by the sensor device (e.g., a transmitter, memory, etc.). As shown, the application may include a communication module 1010, a control program module 1020, and/or a hardware interface module 1030.

The communication module 1010 may be adapted to communicate with various other devices (e.g., user devices, server devices, advertising mediums, etc.) via one or more pathways (e.g., Bluetooth channels, WiFi networks, the Internet, etc.). The control program module 1020 may be adapted to implement various pre-programmed operations of the sensor, where such operations may be re-programmed in some embodiments (e.g., via the server, via a mobile device, etc.). The hardware interface module 1030 may be adapted to control and/or communicate with various elements of the sensor device (e.g., a transmitter, receiver, indicators, etc.).

One of ordinary skill in the art will recognize that the sensor application 1000 is conceptual in nature and may be implemented in various different ways without departing from the spirit of the invention. For instance, various elements may be removed and/or various other elements may be included. In addition, multiple elements may be combined into a single element and/or a single element may be divided into multiple elements. Furthermore, various other communication pathways may be utilized and/or included.

Figure 11:
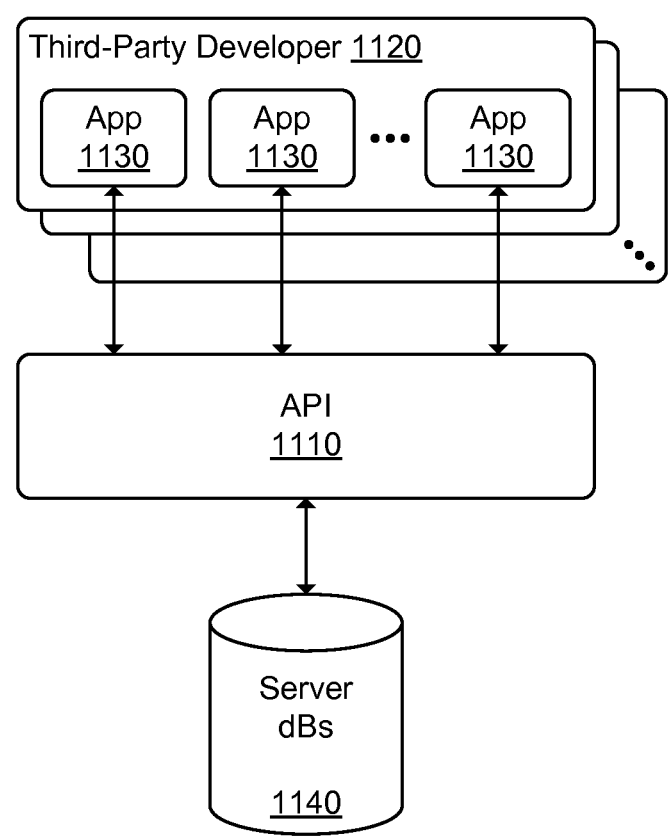
FIG. 11 illustrates a schematic block diagram of a system including an application interface provided by some embodiments of the invention.

FIG. 11 illustrates a schematic block diagram of a system 1100 including an application interface 1110 provided by some embodiments of the invention. Specifically, this figure shows various system components that may be provided to third-party application developers in some embodiments. As shown, the system may include the interface 1110, one or more third-party developers 1120, one or more applications 1130, and one or more server databases 1140.

The interface 1110 may allow third-party application developers 1120 to develop various third-party applications 1130 that may be able to access the server databases 1140 through the interface 1110.

The interface 1110 may include, for example, a representational state transfer ("REST") interface (and/or other appropriate interfaces) that may allow third-party developers to utilize http commands to access the server databases 1120. In addition, third-party developers may be able to reconfigure sensor operation using the interface 1110 to manipulate sensor data stored on the databases 1120. Such sensor operation may be at least partially controlled via parameters such as beacon strength and/or direction, data associated with advertising content for some advertising medium, etc.

One of ordinary skill in the art will recognize that the system 1100 is conceptual in nature and may be implemented in various different ways without departing from the spirit of the invention. For instance, various elements may be removed and/or various other elements may be included. In addition, multiple elements may be combined into a single element and/or a single element may be divided into multiple elements. Furthermore, various other communication pathways may be utilized and/or included.

Figure 12:
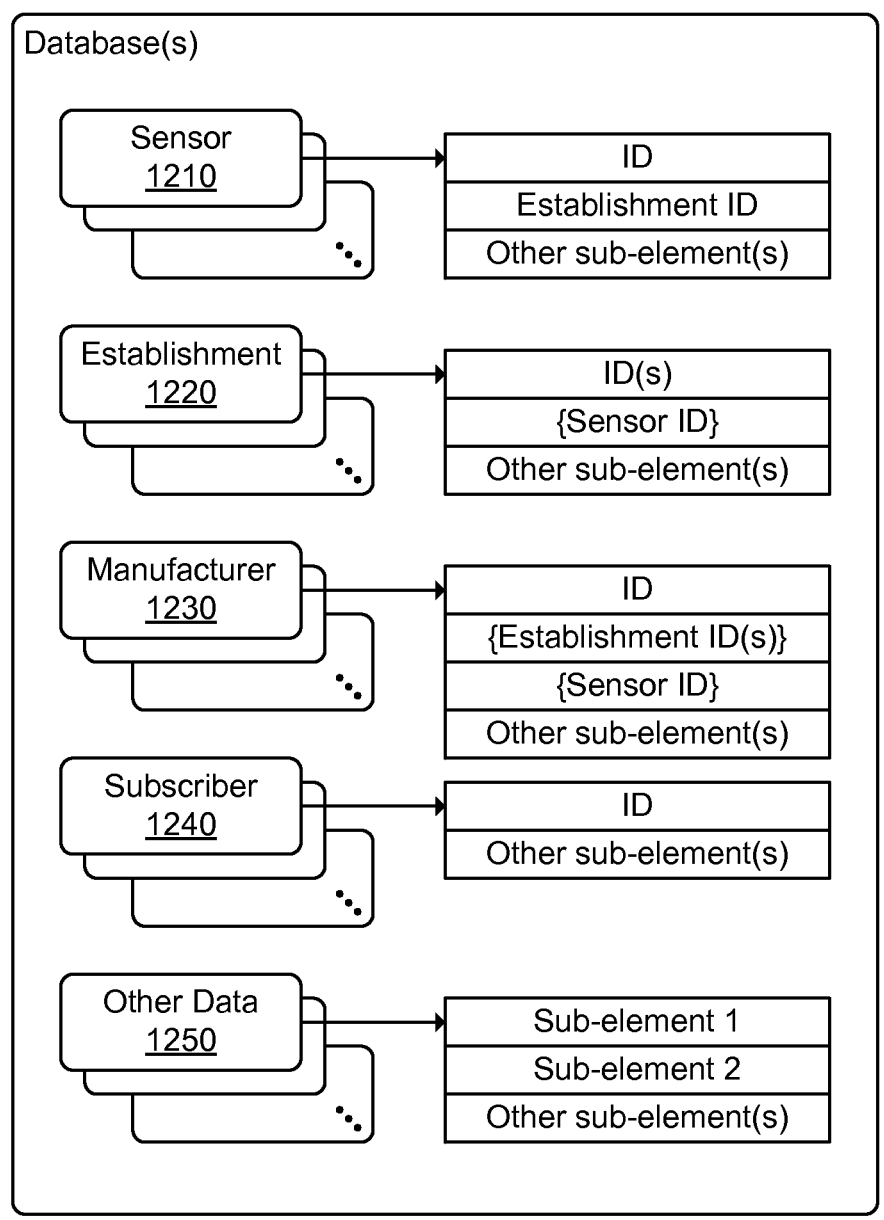
FIG. 12 illustrates a block diagram of a database including various conceptual data structures used by some embodiments of the invention.

FIG. 12 illustrates a block diagram of a database 1200 including various conceptual data structures or elements 1210-1240 used by some embodiments of the invention. Specifically, this figure shows various data elements that may be utilized by some embodiments of the invention. As shown, the database 1200 of some embodiments may include one or more sensor data elements 1210, one or more establishment data elements 1220, one or more manufacturer data elements 1230, one or more subscriber data elements 1240, and/or one or more other data elements 1250.

Each sensor data element 1210 may include an ID, an establishment ID, and/or other sub-elements (e.g., events associated with the sensor). Each establishment data element 1220 may include one or more IDs (each ID may correspond to a particular location of the establishment, such as one establishment among a retail chain or a zone within a single establishment), a set of associated sensor IDs, and/or other sub-elements (e.g., menu tables, order tables, shopping carts, etc.). Each manufacturer data element 1230 may include an ID, a set of establishment IDs (each associated establishment may correspond to a particular establishment and/or location), a set of sensor IDs, and/or other sub-elements (e.g., brands associated with the manufacturer, special offers associated with the manufacturer, etc.). Each subscriber (or consumer) data element 1240 may include an ID and/or other sub-elements (e.g., a username, password, and/or other sub-elements such as attributes and/or history related to the subscriber). Each other data element 1250 may include one or more sub-elements, where each sub-element may include some data item related to the data element.

One of ordinary skill in the art will recognize that the data structures of FIG. 12 are conceptual in nature and may be implemented in various different ways without departing from the spirit of the invention. For instance, although the database is represented as a single entity, it may in fact be implemented using multiple physical systems distributed among various locations. As another example, various groups of data elements may be combined to form tables of data. As yet another example, various sub-elements may be associated with multiple data elements, as appropriate.

Figure 13:
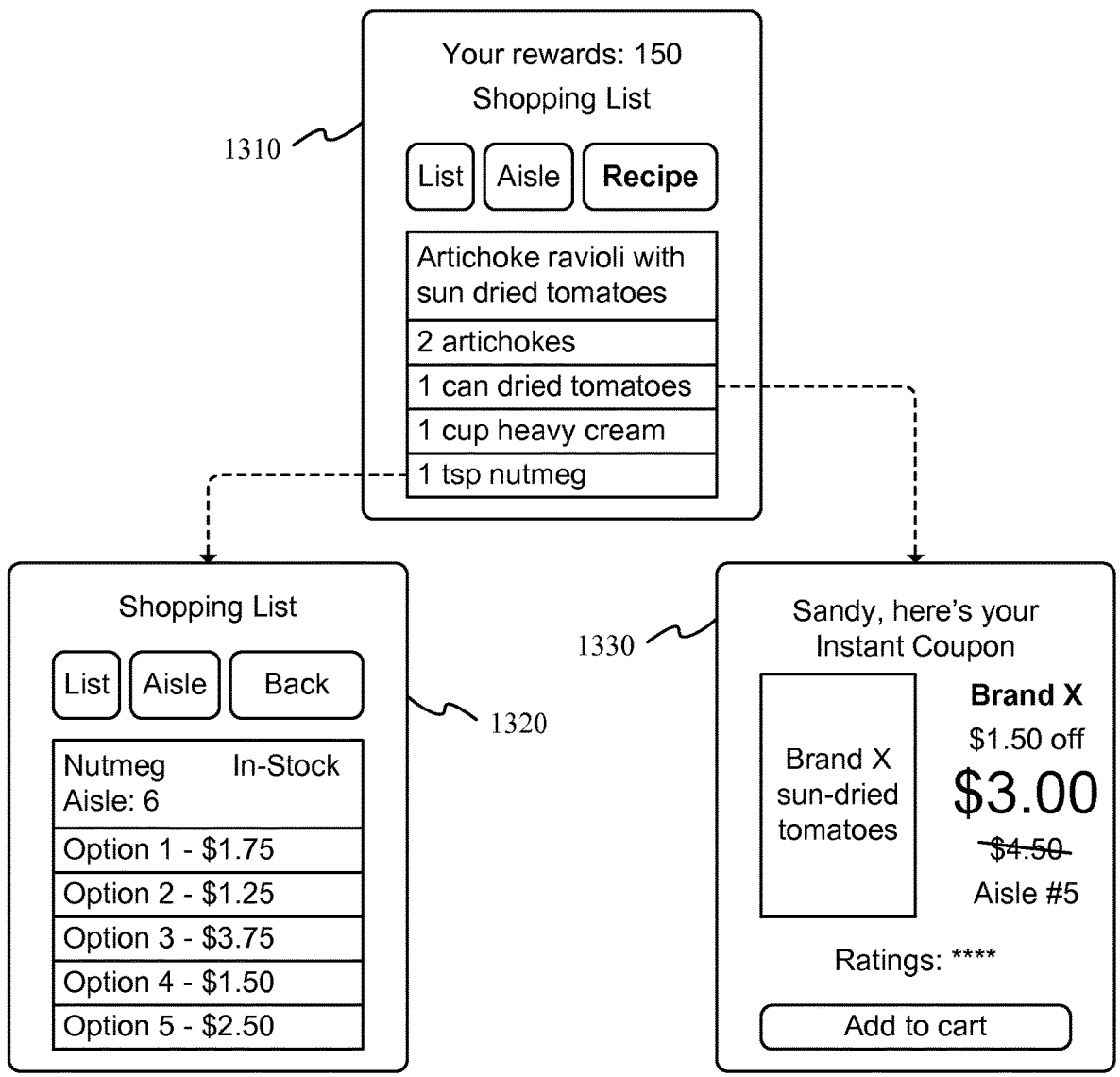
FIG. 13 illustrates several example graphical user interfaces (GUIs) provided by some embodiments.

FIG. 13 illustrates several example GUIs 1310-1330 provided by some embodiments. Specifically, this figure shows various example screens that may be displayed to a consumer during a shopping excursion. As shown, the first GUI 1310 includes a main navigation screen with various selectable buttons, selectable list items, account indicators, etc.

The second GUI 1320 includes a product list sorted by brand which may include inventory and location within an establishment. The second GUI may be activated, for instance, when a user selects a list item (e.g., by pressing a touchscreen, by positioning a cursor, etc.). The third GUI 1330 may be activated, for instance, when a user selects a list item with an associated marketing offer. As shown, the third GUI 1330 may include various multimedia elements and may allow a user to receive some special savings (e.g., a coupon, a user-specific reward, etc.). In addition, this example shows that some elements may be personalized (e.g., the consumer may be referred to by her name, a nickname/username, and/or other appropriate ways).

In addition, such GUIs may include elements such as, for example, a rewards indicator (e.g., a display of points associated with a loyalty reward program), various ratings, recommendations, etc. The GUIs may also allow a user to perform actions (e.g., "add to cart", "add to loyalty card", "add to credit card rewards", etc.). This may allow, for instance, a user to utilize a loyalty rewards program without having to carry a rewards card.

One of ordinary skill in the art will recognize that the GUIs of FIG. 13 are conceptual in nature and may be implemented in various different ways without departing from the spirit of the invention. For instance, although each GUI is represented as having various selection buttons, such selections may be made in various different ways (e.g., using voice commands, using a touch screen, etc.). As another example, various groups of listing elements may be formatted and displayed in various different ways (e.g., using tables, bulleted lists, etc.). As yet another example, various promotional elements may be presented in various appropriate ways (e.g., by providing multimedia content, by providing text-based content, etc.).

III. Methods of Operation

Figure 14:
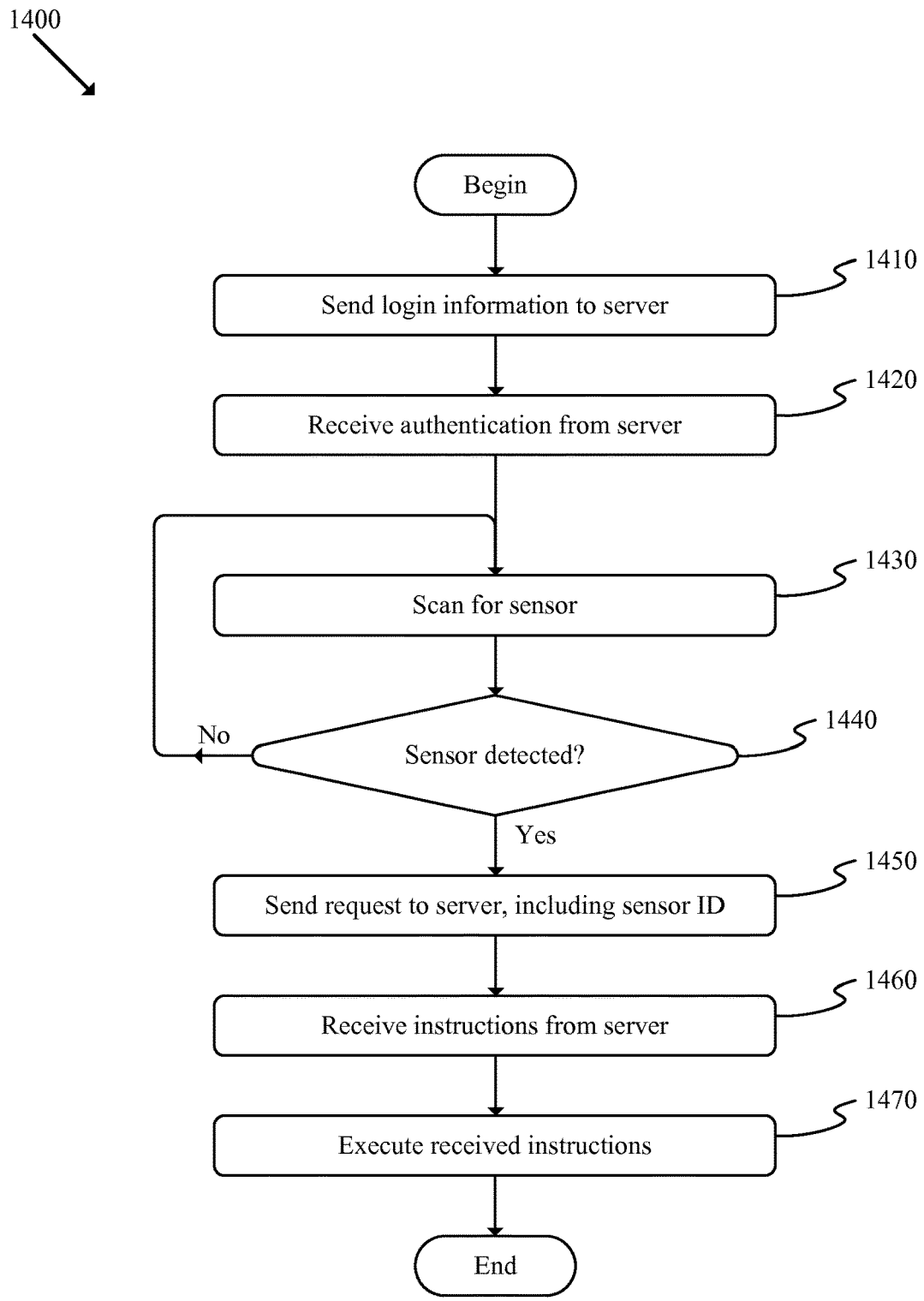
FIG. 14 illustrates a flow chart of a conceptual process used by some embodiments of the invention to allow a consumer to interact with the system of FIG. 1.

FIG. 14 illustrates a flow chart of a conceptual process 1400 used by some embodiments of the invention to allow a consumer to interact with the system 100. Process 1400 may begin, for instance, when a user launches a client application on a mobile device.

Process 1400 may then send (at 1410) login information to a server. Such login information may include a user account name, account password, device identification, etc. The process then may receive (at 1420) authentication from the server. Such authentication may include a message, flag, or other appropriate indication that the user has been authenticated (or not). When the user authentication is not received within a certain time period or when a rejection of the login information is received, the process may end.

Otherwise, when a valid authentication is received, the process may scan (at 1430) for a sensor. The process may then determine (at 1440) whether a sensor is detected. Such a determination may be based on various appropriate factors (e.g., proximity to the sensor, event(s) associated with the sensor, etc.). If a sensor is not detected, the process may repeatedly or continuously scan (at 1430) for a sensor until a sensor is detected or the client application is terminated.

If the process determines (at 1440) that a sensor has been detected, the process may send (at 1450) a request to the server. Such a request may include the sensor ID, user location, etc.

The process may then receive (at 1460) instructions from the server. Such instructions may include various actions to be performed by the user device (e.g., displaying a coupon, playing a sound, displaying a video, etc.) which may be associated with various multimedia data (e.g., coupons, advertisements, news, music, etc.) that may also be received from the server.

Next, process 1400 may execute (at 1470) any received instructions. After executing (at 1470) the received instructions, the process may end.

One of ordinary skill in the art will recognize that process 1400 is conceptual in nature and may be implemented in various different ways without departing from the spirit of the invention. For instance, the operations may be performed in different orders. As another example, various operations may be omitted and/or other operations may be included. Furthermore, the process, or portions thereof, may be executed as part of a larger macro-process, and/or divided into multiple sub-processes. Moreover, the process, or portions thereof, may be executed continuously, at regular intervals, based on certain criteria, and/or in other appropriate ways.

Figure 15:
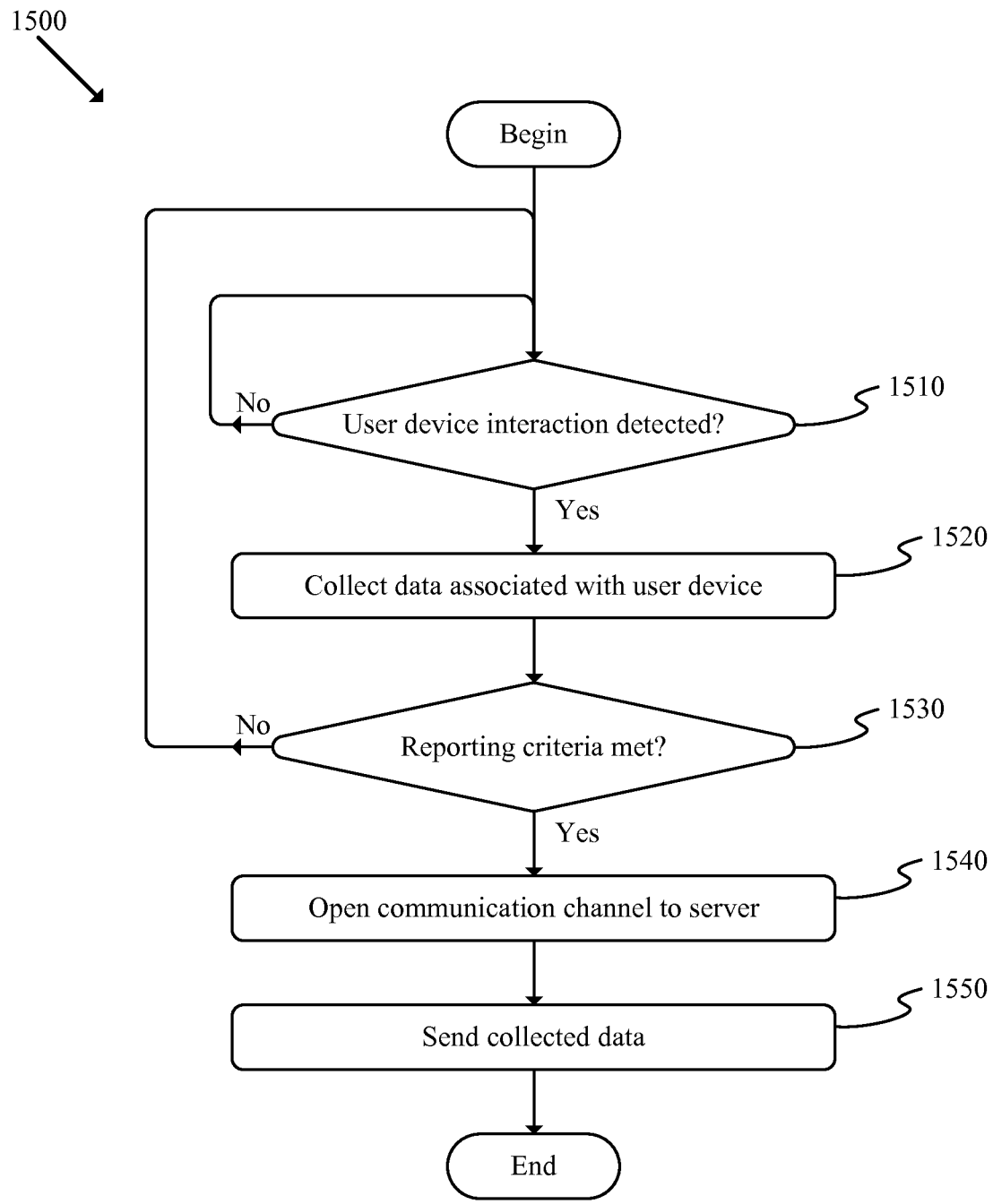
FIG. 15 illustrates a flow chart of a conceptual process used by some embodiments of the invention to allow reporting of consumer interactions via the system of FIG. 2.

FIG. 15 illustrates a flow chart of a conceptual process 1500 used by some embodiments of the invention to allow reporting of consumer interactions via system 200. Process 1500 may be executed at least partly by a device such as sensor 400 described above. Process 1500 may begin, for instance, when a sensor is powered on.

Process 1500 may then determine (at 1510) whether interaction with a user device has been detected. Such detection may be based on various relevant factors. For instance, in some embodiments a sensor may be able to detect signals sent from the user device (e.g., Bluetooth signals, WiFi signals, etc.).

If the process determines (at 1510) that interaction with a user device has not been detected, the process may repeat operation 1510 until the process determines (at 1510) that interaction with a user device has been detected. If the process determines (at 1510) that interaction with a user device has been detected, the process may then collect (at 1520) data associated with the user device. Such data may include information such as device type, connection type, information regarding a user of the device, etc.

The process may then determine (at 1530) whether some reporting criteria have been met (e.g., a minimum number of device interactions detected, a length of time since the last report was sent, etc.). If the process determines (at 1530) that the reporting criteria has not been met, the process may repeat operations 1510-1530 until the process determines (at 1530) that the reporting criteria has been met.

If the process determines (at 1530) that the reporting criteria have been met, the process may then open (at 1540) a communication channel to the server (e.g., by sending a message over one or more network connections). Next, the process may send (at 1550) the collected data to the server and then end. Such data may be associated with a particular sensor ID (which may, in turn, be associated with a particular location or element).

Such data may be stored by the server and made available to various third parties, as appropriate. For instance, an advertiser may place a sensor in proximity to an advertising element (e.g., a sign, a billboard, etc.) and collect data regarding traffic, effectiveness and engagement of mobile users, etc. In some embodiments, such data may be collected by a server via the user devices (e.g., using system 100) using the sensor ID.

In some embodiments, the sensor may collect data regarding each user device and send the data to the server. The server may, in turn, send a message to the user device based on some notification criteria (e.g., the user's opt-in to receive such messages, a relevance of some offer to a particular user's preferences, etc.).

One of ordinary skill in the art will recognize that process 1500 is conceptual in nature and may be implemented in various different ways without departing from the spirit of the invention. For instance, the operations may be performed in different orders. As another example, various operations may be omitted and/or other operations may be included. Furthermore, the process, or portions thereof, may be executed as part of a larger macro-process, and/or divided into multiple sub-processes. Moreover, the process, or portions thereof, may be executed continuously, at regular intervals, based on certain criteria, and/or in other appropriate ways.

Figure 16:
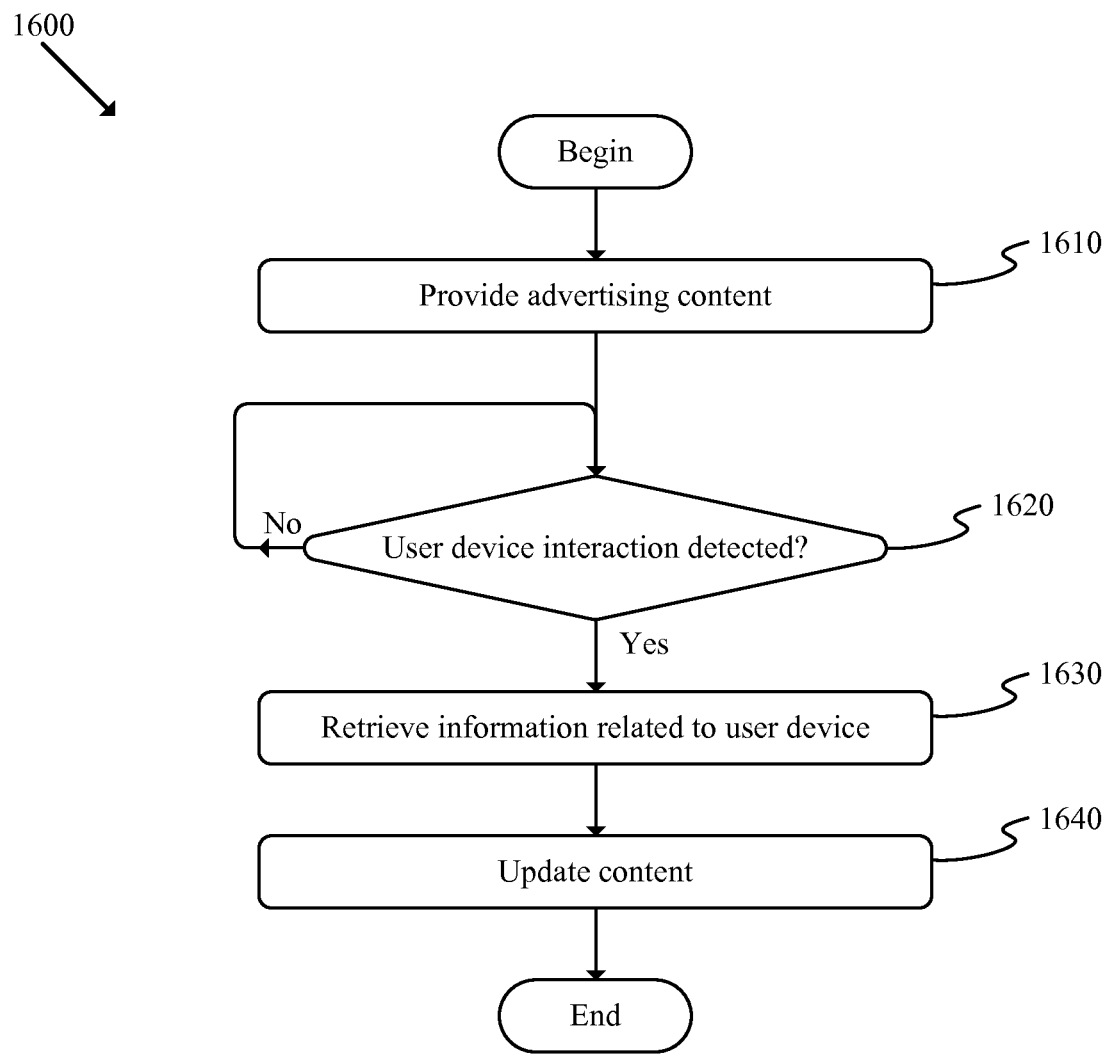
FIG. 16 illustrates a flow chart of a conceptual process used by some embodiments of the invention to provide targeted advertising via the system of FIG. 2.

FIG. 16 illustrates a flow chart of a conceptual process 1600 used by some embodiments of the invention to provide targeted advertising via system 200. Process 1600 may be executed at least partly by a device such as sensor 400 described above and/or one or more advertising mediums such as medium 210 described above. Process 1600 may begin, for instance, when a sensor and/or advertising medium is powered on.

Next, the process may provide (at 1610) advertising content. Such content may include, for instance, video content, audio content, multimedia content, etc. Such content may be provided via various appropriate systems and/or devices (e.g., video monitors and/or displays, audio output devices such as amplifiers and speakers, multi-position billboards, interactive devices such as tablets, etc.).

Process 1600 may then determine (at 1620) whether interaction with a user device has been detected. Such detection may be based on various relevant factors. For instance, in some embodiments a sensor may be able to detect signals sent from the user device (e.g., Bluetooth signals, WiFi signals, etc.).

If the process determines (at 1612) that interaction with a user device has not been detected, the process may repeat operation 1620 until the process determines (at 1620) that interaction with a user device has been detected. If the process determines (at 1620) that interaction with a user device has been detected, the process may then retrieve (at 1630) information related to the user device. Such information may include, for instance, device type, connection type, information regarding a user of the device, etc.

The process may then update (at 1640) the advertising content. Such an update may involve sending content to display or other external device, sending a control signal or message that causes the advertising medium to update the displayed content (e.g., by cycling to a next display in a multi-display billboard), and/or other appropriate ways. In some embodiments, the process may send a message to the user device (when determining that a user has opted-in to receive such messages) regarding the displayed content (e.g., a coupon or other special offer that is not available to users that have not opted-in or to the general public).

One of ordinary skill in the art will recognize that process 1600 is conceptual in nature and may be implemented in various different ways without departing from the spirit of the invention. For instance, the operations may be performed in different orders. As another example, various operations may be omitted and/or other operations may be included. Furthermore, the process, or portions thereof, may be executed as part of a larger macro-process, and/or divided into multiple sub-processes. Moreover, the process, or portions thereof, may be executed continuously, at regular intervals, based on certain criteria, and/or in other appropriate ways.

Figure 17:
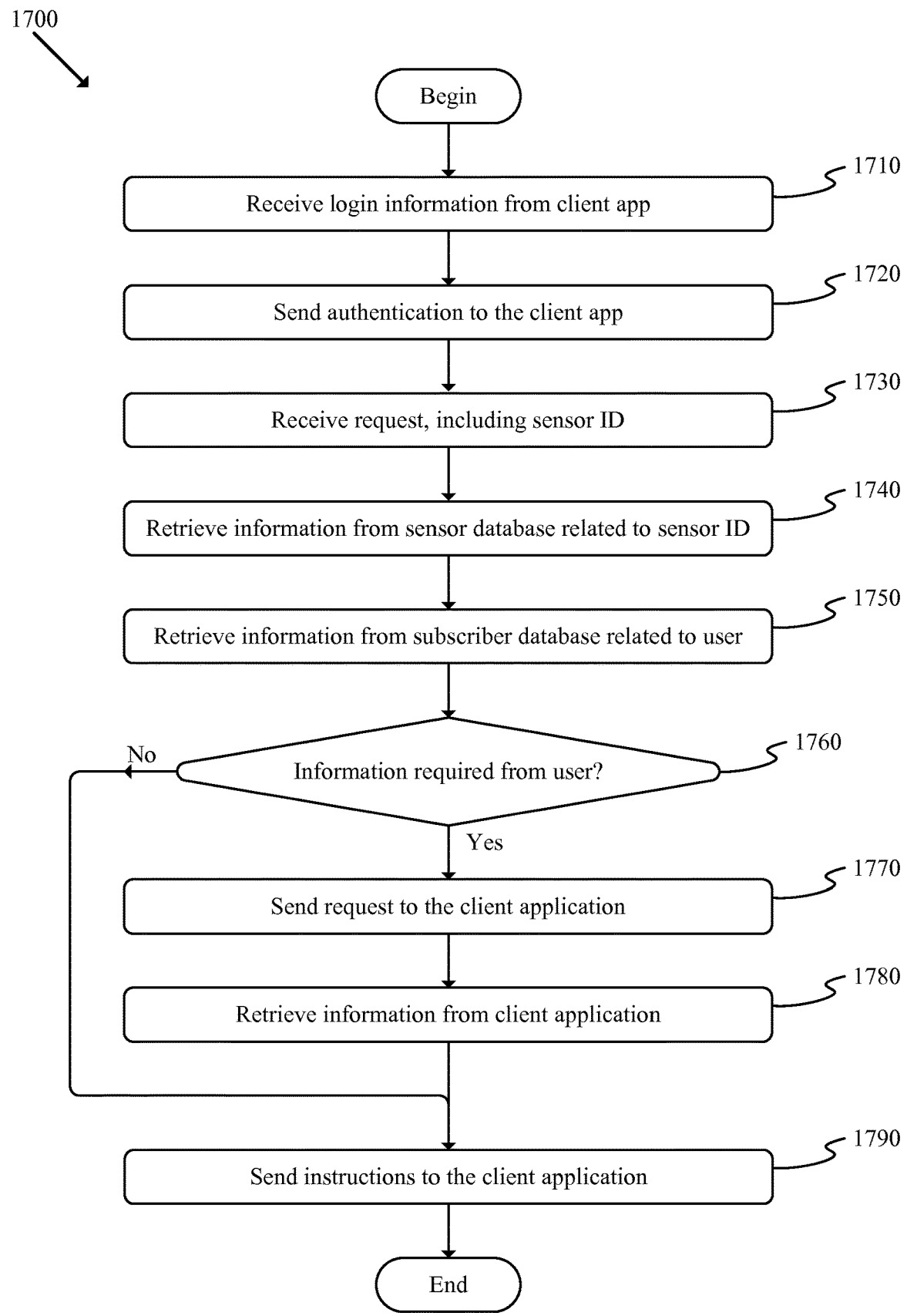
FIG. 17 illustrates a flow chart of a conceptual process used by some embodiments of the invention to communicate among the server(s) and user application(s) during consumer interaction.

FIG. 17 illustrates a flow chart of a conceptual process 1700 used by some embodiments of the invention to communicate among the server(s) and user application(s) during consumer interaction. The process may begin, for instance, when a client application attempts to communicate with a server application of some embodiments.

Next, the process may receive (at 1710) login information from the client application. Such login information may include a username, password, device identification, and/or other appropriate information.

The process may then send (at 1720) an authentication to the client application. Such authentication may include a confirmation signal, message, and/or other appropriate indicator that the login information has been verified.

Next, the process may receive (at 1730) a request. Such a request may include a sensor ID and other appropriate information (e.g., user location).

Process 1700 may then retrieve (at 1740) information from a sensor database related to the sensor ID. Such information may include sensor type, sensor location, etc.

Next, the process may retrieve (at 1750) information from a subscriber database related to one or more users associated with the user account. Such information may include, for example, historic purchase records, user preferences, etc.

The process then may determine (at 1760) whether additional information is required from the user. Such a determination may be based at least partly on the selected sensor and/or user account. For example, certain sensors may require additional information (e.g., user age, sex, etc.) to verify whether an event should be triggered.

If the process determines (at 1760) that additional information is required, the process may send (at 1770) a request to the client application. Such a request may include a listing the required additional information.

The process may then retrieve (at 1780) the requested information from the client application (e.g., by prompting the user to make various entries and/or selections).

After retrieving (at 1780) information from the client application, or if the process determines (at 1760) that information from the user is not required, the process may then send (at 1790) instructions to the client application. Such instructions may include various multimedia data (e.g., coupons, advertisements, news, music, etc). For example, the server may send a link for users, which may include a coupon, advertisement, music, etc. After sending (at 1790) instructions to the client application, the process may end.

One of ordinary skill in the art will recognize that process 1700 is conceptual in nature and may be implemented in various different ways without departing from the spirit of the invention. For instance, the operations may be performed in different orders. As another example, various operations may be omitted and/or other operations may be included. Furthermore, the process, or portions thereof, may be executed as part of a larger macro-process, and/or divided into multiple sub-processes. Moreover, the process, or portions thereof, may be executed continuously, at regular intervals, based on certain criteria, and/or in other appropriate ways.

Figure 18:
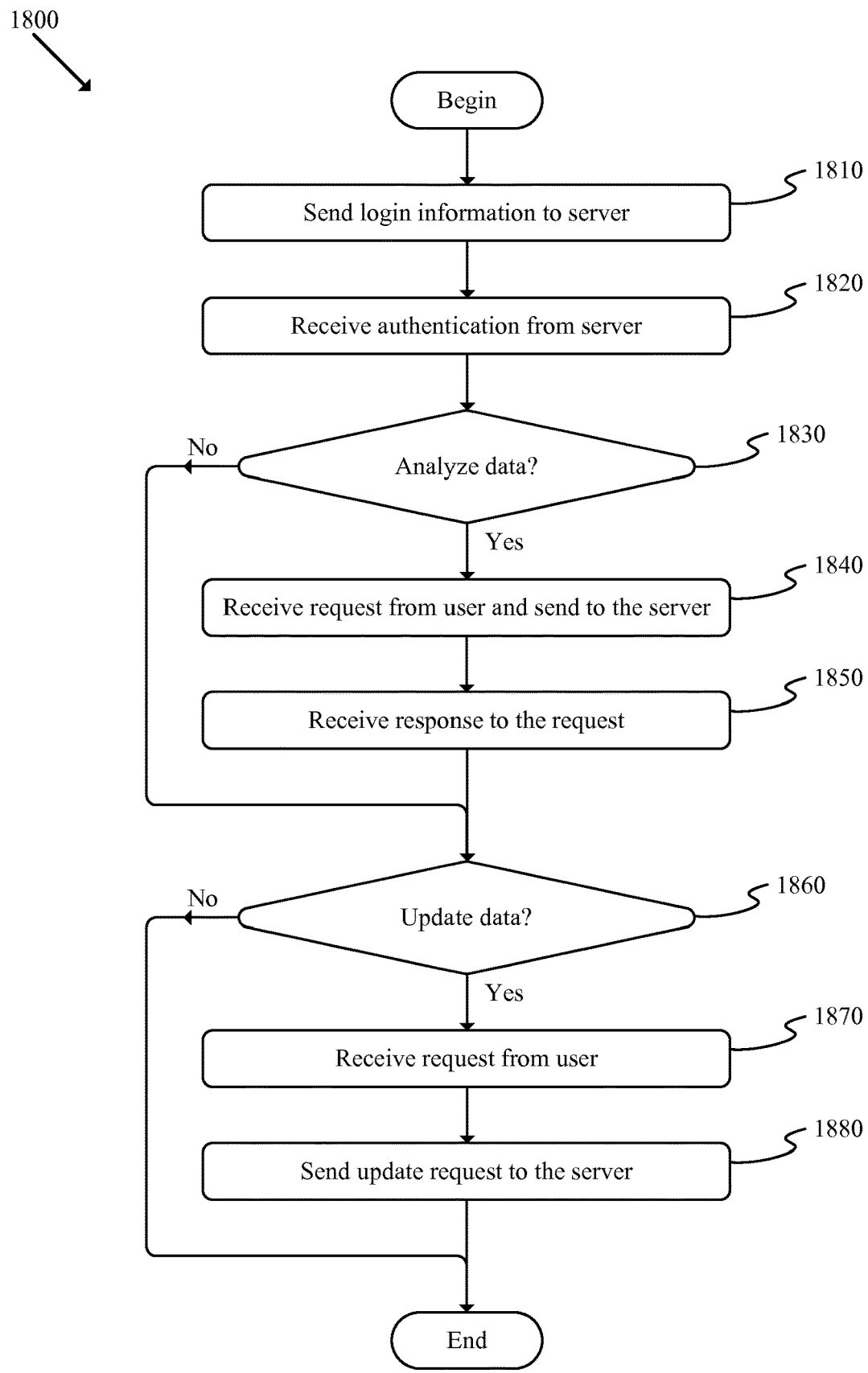
FIG. 18 illustrates a flow chart of a conceptual process used by some embodiments of the invention to allow a user to interact with the system of FIG. 1.

FIG. 18 illustrates a flow chart of a conceptual process 1800 used by some embodiments of the invention to allow a user to interact with the system 100. Process 1800 may begin, for instance, when a user launches a user application on a mobile device.

Process 1800 may then send (at 1810) login information to the server. Such login information may include a username, password, device ID, etc. Next, the process may receive (at 1820) authentication from the server. Alternatively, authentication may not be received and the process may end. The process may then determine (at 1830) whether data analysis is required. Such a determination may be based on data entered by a user (e.g., the user may select a data analysis option, provide a dataset for analysis, and/or otherwise indicate that analysis is required). If the process determines (at 1830) that data analysis is required, the process may receive (at 1840) a request from the user and send it to the server. Such a request may include data such as user type, establishment type, establishment location, etc.

Next, the process may receive (at 1850) a response to the request. Such a response may include different types of data (e.g., a table, list, etc.). After receiving (at 1850) a response to the request, or if the process determines (at 1830) that data analysis is not required, the process may then determine (at 1860) whether to update data. Such a determination may be made based on various relevant factors (e.g., availability of new data, a user update request, etc.).

If the process determines (at 1860) that an update is to be made, the process may receive (at 1870) an update request from the user. Such a request may include various data attributes to be updated (e.g., sensor data, campaign data, etc.). Next, the process may send (at 1880) the update request to the server.

After sending (at 1880) the update request to the server, or if the process determines (at 1860) that no data updates are required, the process may end.

One of ordinary skill in the art will recognize that process 1800 is conceptual in nature and may be implemented in various different ways without departing from the spirit of the invention. For instance, the operations may be performed in different orders. As another example, various operations may be omitted and/or other operations may be included. Furthermore, the process, or portions thereof, may be executed as part of a larger macro-process, and/or divided into multiple sub-processes. Moreover, the process, or portions thereof, may be executed continuously, at regular intervals, based on certain criteria, and/or in other appropriate ways.

Figure 19:
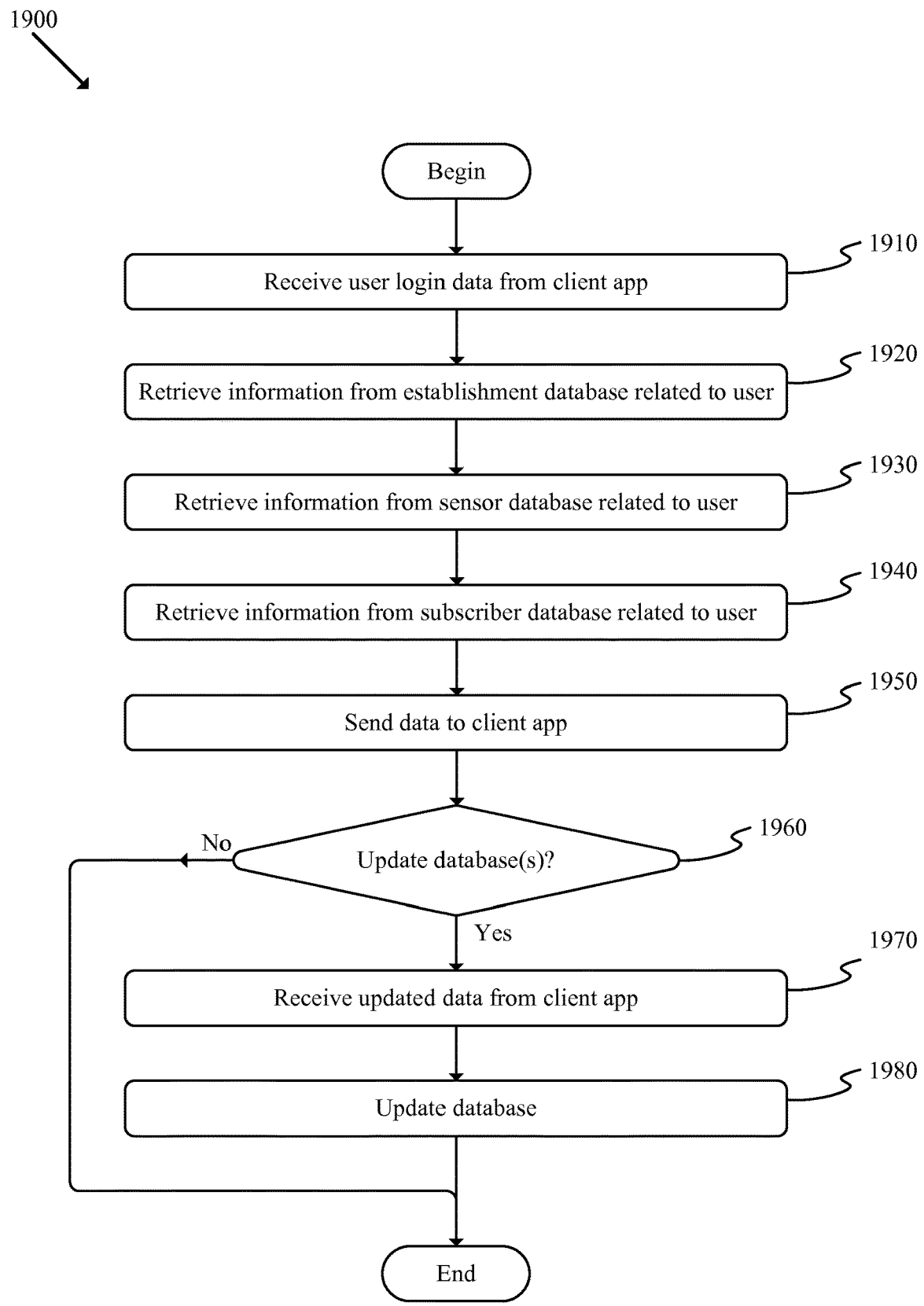
FIG. 19 illustrates a flow chart of a conceptual process used by some embodiments of the invention to communicate among the server(s) and user application(s) during user interaction.

FIG. 19 illustrates a flow chart of a conceptual process 1900 used by some embodiments of the invention to communicate among the server(s) and user application(s) during user interaction. The process may begin, for instance, when an establishment-user or manufacturer-user launches a client application.

Next, the process may receive (at 1910) user login data from a client application. Such login information may include a username, password, device ID, and/or other appropriate information. The process then may retrieve (at 1920) information from an establishment database related to the user.

Next, the process may retrieve (at 1930) information from a sensor database related to the user. Process 1900 may then retrieve (at 1940) information from a subscriber database related to the user.

The process may then send (at 1950) data to a client application. Such data may include establishment, sensor and/or subscriber information.

The process then may determine (at 1960) whether to update database(s) associated with the user. If the process determines (at 1960) that an update to the database(s) is needed, the process may receive (at 1970) updated data from the client application. Such data may include establishment data, sensor data, etc. Next, the process may update (at 1980) the database(s) based on the received data.

After updating (at 1980) the database(s), or if the process determines (at 1960) that updated database(s) are not requested, the process may end.

One of ordinary skill in the art will recognize that process 1900 is conceptual in nature and may be implemented in various different ways without departing from the spirit of the invention. For instance, the operations may be performed in different orders. As another example, various operations may be omitted and/or other operations may be included. Furthermore, the process, or portions thereof, may be executed as part of a larger macro-process, and/or divided into multiple sub-processes. Moreover, the process, or portions thereof, may be executed continuously, at regular intervals, based on certain criteria, and/or in other appropriate ways.

Figure 20:
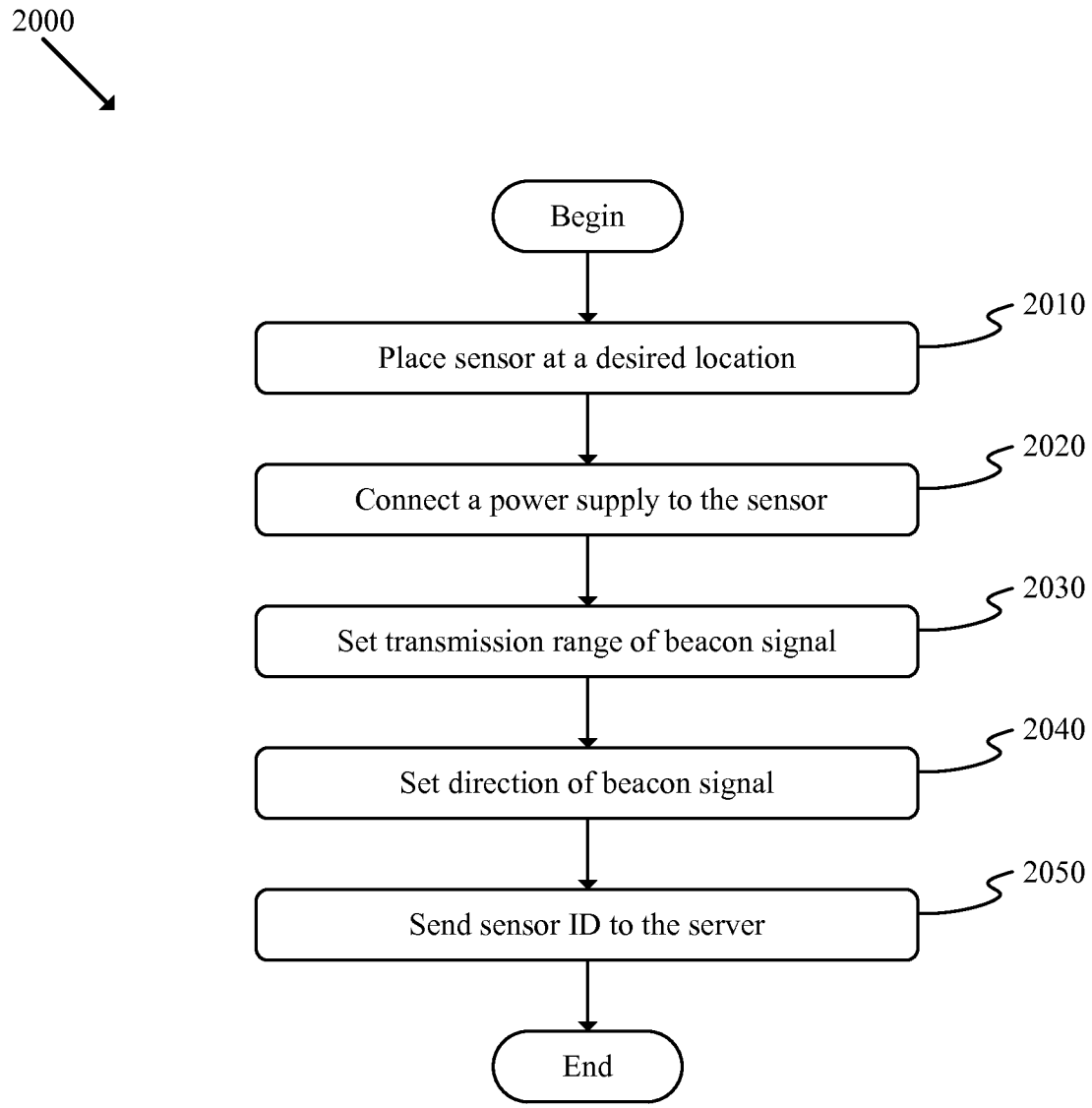
FIG. 20 illustrates a flow chart of a conceptual process used by some embodiments to configure a sensor used by some embodiments of the system of FIG. 1.

FIG. 20 illustrates a flow chart of a conceptual process 2000 used by some embodiments to configure a sensor used by some embodiments of the system 100. Such a process may begin, for instance, when an establishment and/or manufacturer decides to install a sensor.

Process 2000 may then place (at 2010) the sensor at a desired location. For example, the establishment-user and/or manufacturer-user may place the sensor at an appropriate location within an establishment.

Next, the process may connect (at 2020) a power supply to the sensor. Such a power supply may be connected by inserting a set of batteries into the sensor, connecting an AC power supply to the sensor, and/or other appropriate ways.

The process may then set (2030) a transmission range of a beacon signal associated with the sensor. The transmission range of the beacon signal may be configured in various appropriate ways (e.g., by manipulating server data associated with the sensor, by programming the internal memory of the sensor, etc.).

After setting (2030) the transmission range, the process then may set (2040) a direction of the beacon signal. The direction may be set relative to a defined location of the sensor. The angle and/or spread (or span) of the beacon signal may also be programmed.

Next, the process may send (at 2040) the sensor ID to the server. In some embodiments, the sensor ID may already be known to the server, and the sensor may be associated with a particular location, establishment, etc. After sending (at 2040) the sensor ID to the server, the process may end.

One of ordinary skill in the art will recognize that process 2000 is conceptual in nature and may be implemented in various different ways without departing from the spirit of the invention. For instance, the operations may be performed in different orders. As another example, various operations may be omitted and/or other operations may be included. Furthermore, the process, or portions thereof, may be executed as part of a larger macro-process, and/or divided into multiple sub-processes. Moreover, the process, or portions thereof, may be executed continuously, at regular intervals, based on certain criteria, and/or in other appropriate ways.

Figure 21:
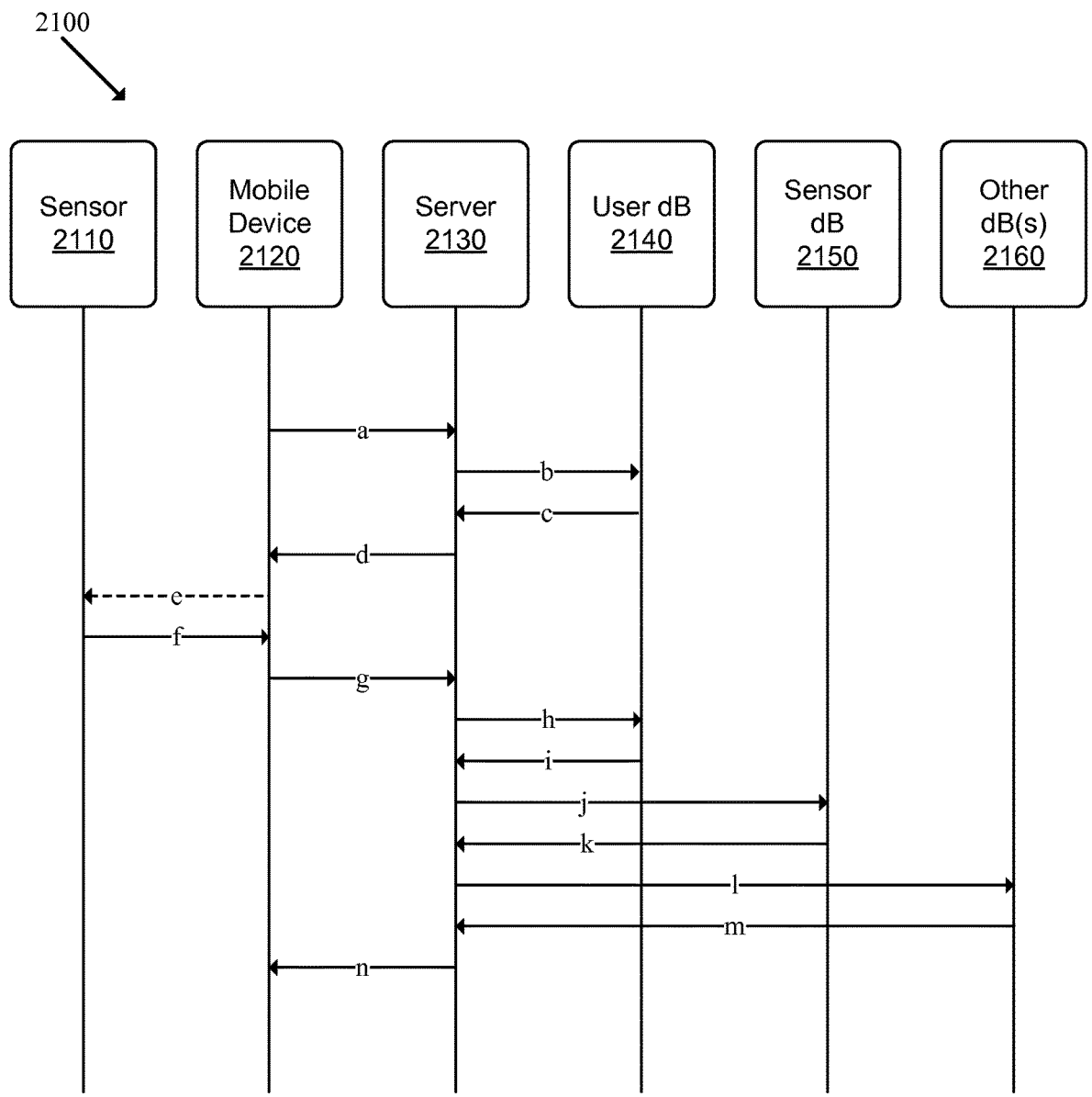
FIG. 21 illustrates a conceptual message flow diagram used by some embodiments of the invention to communicate among various elements of the system of FIG. 1.

FIG. 21 illustrates a conceptual message flow diagram 2100 used by some embodiments of the invention to communicate among various elements of the system 100. Specifically, this figure shows the message types and sequence of various communications sent among the components of the system. As shown, the message flow may include a sensor 2110, a mobile device 2120, a server 2130, a user database 2140, a sensor database 2150, and/or other databases 2160.

Sensor 2110 may be similar to sensor 400 described above in reference to FIG. 4. Mobile device 2120 may be a user device that includes one or more wireless communication features such as a smart phone, tablet, personal computer, etc. Server 2130 may include one or more remote devices that are able to communicate with various system elements (e.g., using one or more networks). User database 2140 may include various data elements related to a user of the system (e.g., username, password, shopping lists, etc.). Sensor database 2150 may include various data elements related to sensors provided by the system (e.g., sensor IDs, locations, etc.). The other databases 2160 may include various other data elements associated with the system (e.g., establishment IDs, manufacturer IDs, offers, usage statistics, etc.).

During operation, a consumer may use a mobile device, which may be running a client application, to trigger a proximity event. The example of FIG. 21 is for descriptive purposes, as many different message flows may be implemented, depending on various relevant factors (e.g., user preferences, placement of sensor(s), availability of network connections, etc.).

As shown, the mobile device 2120 may send a message 'a' to the server 2130. Such a message may include information such as a user name and password. The server may, in turn, send a message 'b' to the user database 2140. Such a message may be a request for a password or other information associated with the user. The user database may send a response message 'c' that may include the requested information. Next, the server 2130 may send a message 'd' to the mobile device 2120. Such a message may include various data items related to the user, the user's account, and/or other appropriate data. The messages 'a'-'d' may be used in some embodiments to establish a live session among a user device and the server(s) of some embodiments.

Next, the mobile device 2120 may send a message 'e' to the sensor 2110, which may trigger a response message 'f' from the sensor to the mobile device. Such a response message may include the ID of the sensor. Alternatively, the mobile device 2120 may receive message 'f' from the sensor 2110 without first transmitting message 'e'. For instance, when the mobile device receives a periodically transmitted beacon signal.

Next, the mobile device 2120 may send a message 'g' to the server 2130. Such a message may include information such as the sensor ID, identifying information regarding the user (e.g., username and password), and/or other appropriate information. The server 2130 may, in turn, send a message 'h' to the user database 2140 requesting information related to the user (e.g., user preferences, user history, etc.). The user database may respond with a message 'i' that includes the requested information. The server 2130 may then send a message T to the sensor database 2150 requesting information related to the sensor (e.g., sensor location, associated establishment or manufacturer(s), etc.). The sensor database may respond with a message 'k' that includes the requested information. Next, the server 2130 may send a message '1' to the other databases 2160 requesting other information (e.g., information regarding the establishment, the manufacturers, etc.). The other databases may respond with a message 'm' that includes the requested information.

Finally, the server 2130 may send a message 'n' to the mobile device 2120. Such a message may be based on various received information. The server 2130 may determine the appropriate contents of the message (e.g., based on an offer associated with the establishment or manufacturer, information related to the user's history or preferences, etc.).

After sending the message 'n', the flow may end. Alternatively, messages 'e'-'n' or 'f'-'n' may be continuously repeated as the mobile device encounters other sensors, generating various proximity events.

One of ordinary skill in the art will recognize that the message flow described in reference to message flow diagram 2100 is conceptual in nature and may be implemented in various different ways without departing from the spirit of the invention. For instance, the messages may be sent or received in different orders. As another example, various messages may be omitted and/or other messages may be included. Furthermore, the message flow may be executed as part of a larger macro-flow, and/or divided into multiple sub-flows. Moreover, the message flow, or portions thereof, may be executed continuously, at regular intervals, based on certain criteria, and/or in other appropriate ways.

IV. Example Use Cases

The following sections will describe various use cases of specific example implementations that may use elements of the system, software, and/or methods described above. Such use cases are presented for example purposes only. One of ordinary skill in the art will recognize that different embodiments may implement various specific elements in various different ways.

In one example use case, multiple user devices may be used to collect information regarding a sensor. As each user device encounters a proximity event with the sensor, location information of the user device (e.g., a location determined using a GPS sub-system or application of the user device) may be sent to a server such that the approximate location of the sensor, and hence an object to which the sensor is attached, may be determined by aggregation of location reports transmitted by multiple user devices which were instructed by an application server to report their locations upon moving within a threshold proximity of the sensor. The server may store this information such that interested parties may review and analyze the information.

In another example use case of the present invention, a wireless sensor may be placed at a retail establishment. A mobile application may scan and detect the presence of a beacon signal transmitted by the wireless sensor. The mobile application, which may run on a user device may communicate with a server application. The server application may retrieve sensor data from a sensor database and user-specific data (e.g., gender, age group, ethnicity, income level, personal interests, etc.) from a user database and communicate with the mobile application to present a visual or audible targeted advertisement, sales coupon or special offer that matches a profile associated with the user. The advertisement may be extracted from a pool submitted by corporate marketing departments, merchants, and/or other appropriate parties that have installed wireless sensors at their premises or at common areas in shopping malls, strip malls, and/or other appropriate locations.

In yet another example use case of the present invention, one or more wireless sensors may be placed in, on, or about landmarks and tourist locations run by entities interested in providing information services to visitors on their user devices. When the user device moves within a threshold proximity of the wireless sensor(s), the user device may communicate with an application server which may consult a sensor database based on a sensor ID. The application server may send relevant information in the form of multimedia to the mobile application with instructions as to how to display such information to the user. The information received from the application server may include, for example, text, audio, and/or video that includes relevant information regarding the place or landmark where the wireless sensor is located.

In still another use case of the present invention, a wireless sensor may be installed in an inconspicuous location inside, for example, a vehicle, motorcycle, truck or asset. If the vehicle or asset is lost or stolen, a third-party may report the incident to an application server. The application server may instruct a mobile application to silently monitor for beacon signals from a wireless sensor with the identifier of the lost or stolen vehicle or asset and in the event of a positive scan, which means that the sensor has been found in the proximity of the user device, the mobile application may send location and time information to the application server which may then be used by the third-party to assist in the recovery of the stolen or missing vehicle or asset.

In another use case of the present invention, a wireless sensor may be placed at, for example, a concert venue, theater or park. A third-party may choose to distribute promotional material pertaining to the event occurring at the venue. The attendee to the event may then be instructed to use a user device to obtain such promotional material. A mobile application running on the mobile device may communicate with an application server. The application server may send relevant promotional information based on the sensor ID and the information may be displayed and perceived by any user that moves within a threshold proximity of the wireless sensor.

In yet another use case of the present invention, a wireless sensor may be attached to a particular article (e.g., an item of clothing). A consumer with a user device running a mobile application may move within a threshold proximity to the sensor, thus triggering a proximity event. Such an event may cause a server application to send information regarding the particular article to the user device (e.g., the cost of the article, the materials included in the article, the care requirements of the article, manufacturing processes (e.g., environmental friendliness, fair trade standing, etc.), etc.).

V. Processes for Defining Proximity Event Applications

FIGS. 22-25 describe processes that may be used to define sets of instructions for providing proximity event applications (e.g., a server application, a user application, a consumer application, etc.). In some cases such sets of instructions are defined in terms of object-oriented programming code. Some embodiments may include sets of instructions for defining classes and instantiating various objects at runtime based on the defined classes. The sets of instructions may be stored to an appropriate non-volatile storage medium. In some embodiments, multiple applications may be included on a single medium.

Figure 22:
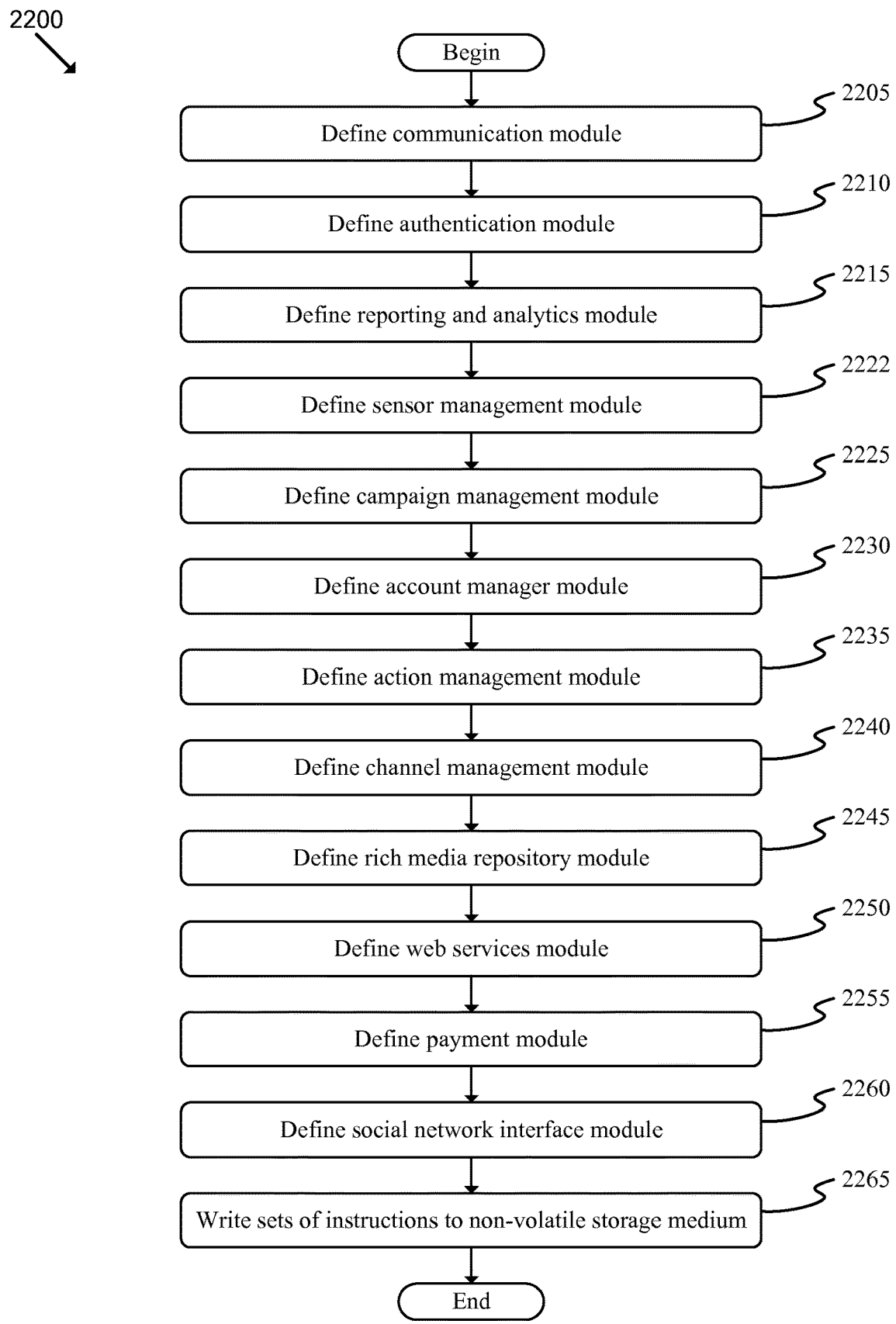
FIG. 22 conceptually illustrates a process of some embodiments for defining and storing a server-side application of some embodiments.

FIG. 22 conceptually illustrates a process 2200 of some embodiments for defining and storing a server-side application of some embodiments, such as application 700 described above in reference to FIG. 7. Specifically, process 2200 illustrates the operations used to define sets of instructions for providing several of the elements shown in the server application 700 and for performing various operations described above.

As shown, the process may define (at 2205) sets of instructions for providing a communication module. The process may then define (at 2210) sets of instructions for providing an authentication module. Next, the process may define (at 2215) sets of instructions for providing a reporting and analytics module. Process 2200 may then define (at 2220) sets of instructions for providing a sensor management module. The process then may define (at 2225) sets of instructions for providing a campaign management module. Next, the process may define (at 2230) sets of instructions for providing an account manager module.

Process 2200 may then define (at 2235) sets of instructions for providing an action management module. Next, the process may define (at 2240) sets of instructions for providing a channel management module. The process may then define (at 2245) sets of instructions for providing a rich media repository module. Process 2200 may then define (at 2250) sets of instructions for providing a web services module. Next, process 2200 may define (at 2255) sets of instructions for providing a payment module. The process may then define (at 2260) sets of instructions for providing a social network interface module. Process 2200 may then write (at 2265) the sets of instructions defined at operations 2205-2260 to a non-volatile storage medium.

Figure 23:
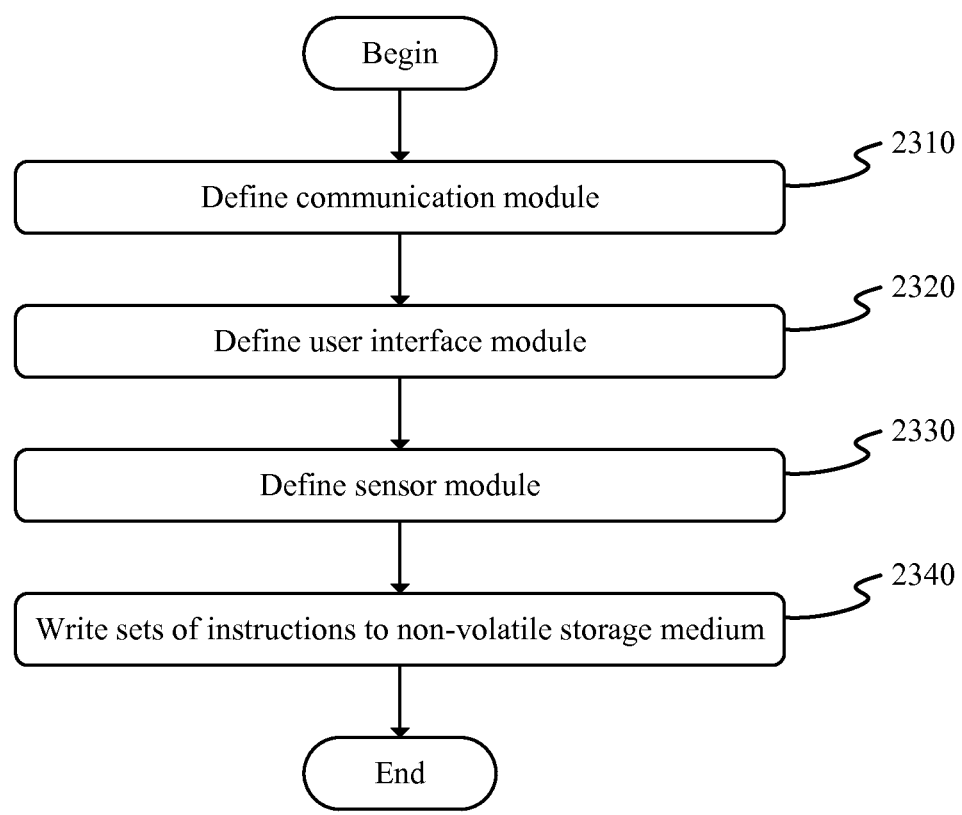
FIG. 23 conceptually illustrates a process of some embodiments for defining and storing a client-side user application of some embodiments.

FIG. 23 conceptually illustrates a process 2300 of some embodiments for defining and storing a client-side user application of some embodiments, such as application 800 described above in reference to FIG. 8. Specifically, process 2300 illustrates the operations used to define sets of instructions for providing several of the elements shown in the client-side user application 800 and for performing various operations described above.

As shown, the process may define (at 2310) sets of instructions for providing a communication module. The process may then define (at 2320) sets of instructions for providing a user interface module. Next, the process may define (at 2330) sets of instructions for providing a sensor module. Process 2300 may then write (at 2340) the sets of instructions defined at operations 2310-2330 to a non-volatile storage medium.

Figure 24:
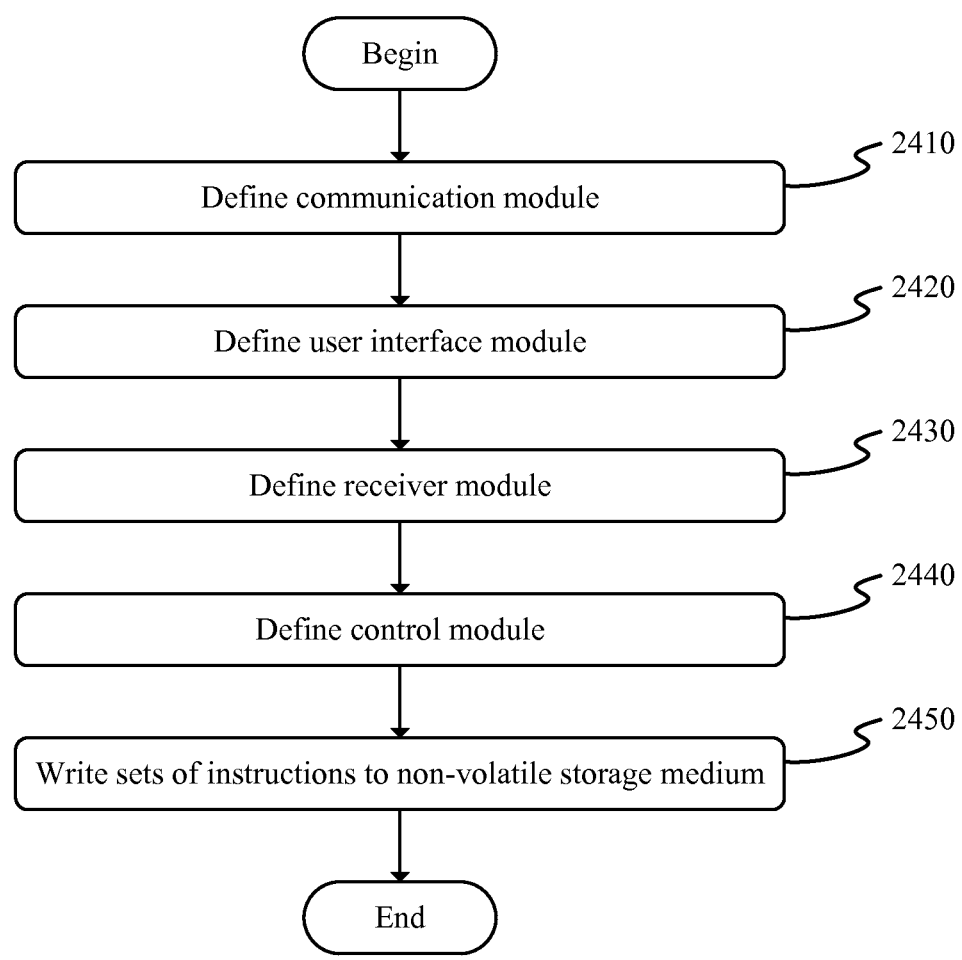
FIG. 24 conceptually illustrates a process of some embodiments for defining and storing a client-side consumer application of some embodiments.

FIG. 24 conceptually illustrates a process 2400 of some embodiments for defining and storing a client-side consumer application of some embodiments, such as application 900 described above in reference to FIG. 9. Specifically, process 2400 illustrates the operations used to define sets of instructions for providing several of the elements shown in the client-side application 900 and for performing various operations described above.

As shown, the process may define (at 2410) sets of instructions for providing a communication module. The process may then define (at 2420) sets of instructions for providing a user interface module. Next, the process may define (at 2430) sets of instructions for providing a receiver module. Process 2400 may then define (at 2440) sets of instructions for providing a control module. The process may then write (at 2450) the sets of instructions defined at operations 2410-2440 to a non-volatile storage medium.

Figure 25:
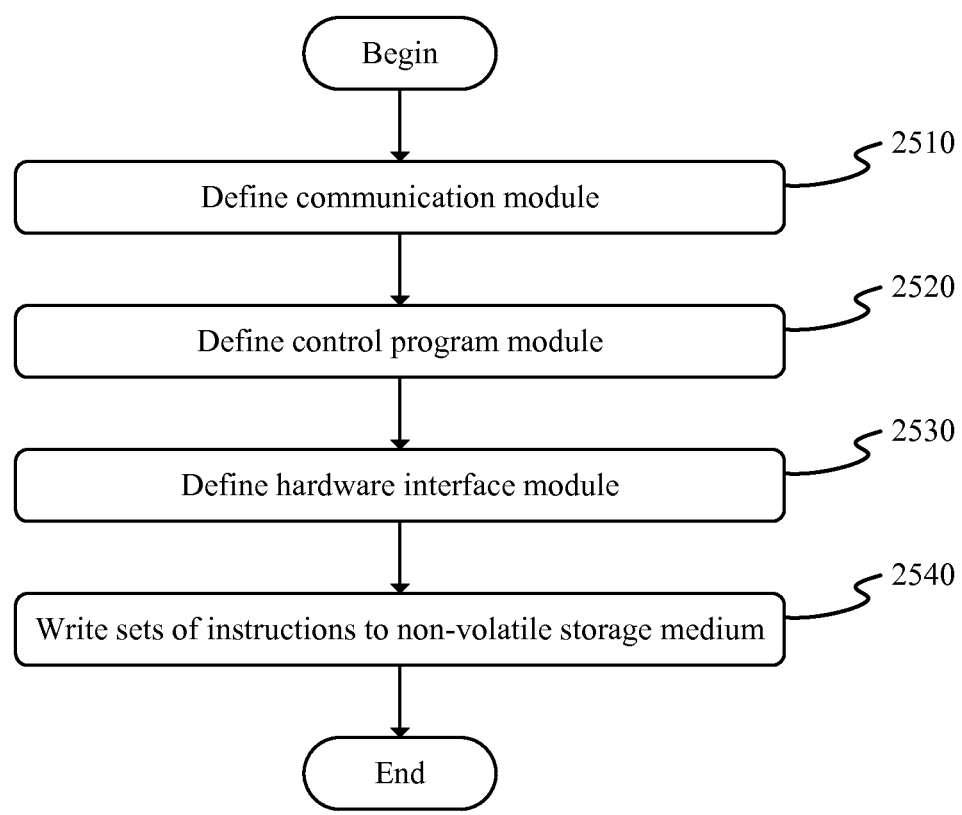
FIG. 25 conceptually illustrates a process of some embodiments for defining and storing a sensor application of some embodiments.

FIG. 25 conceptually illustrates a process 2500 of some embodiments for defining and storing a sensor application of some embodiments, such as application 1000 described above in reference to FIG. 10. Specifically, process 2500 illustrates the operations used to define sets of instructions for providing several of the elements shown in the sensor application 1000 and for performing various operations described above.

As shown, the process may define (at 2510) sets of instructions for providing a communication module. The process may then define (at 2520) sets of instructions for providing a control program module. Next, the process may define (at 2530) sets of instructions for providing a hardware interface module. The process may then write (at 2540) the sets of instructions defined at operations 2510-2530 to a non-volatile storage medium.

One of ordinary skill in the art will recognize that the various sets of instructions defined by processes 2200-2500 are not exhaustive of the sets of instructions that could be defined and established on a non-volatile storage medium for proximity event applications incorporating some embodiments of the invention. In addition, the processes 2200-2500 are conceptual processes, and the actual implementations may vary. For example, different embodiments may define the various sets of instructions in a different order, may define several sets of instructions in one operation, may decompose the definition of a single set of instructions into multiple operations, etc. In addition, the processes 2200-2500 may be implemented as several sub-processes or combined with other operations within a macro-process.

VI. Computer System

Many of the processes and modules described above may be implemented as software processes that are specified as at least one set of instructions recorded on a non-transitory storage medium. When these instructions are executed by one or more computational element(s) (e.g., microprocessors, microcontrollers, Digital Signal Processors ("DSP"), Application-Specific ICs ("ASIC"), Field Programmable Gate Arrays ("FPGA"), etc.) the instructions cause the computational element(s) to perform actions specified in the instructions.

Figure 26:
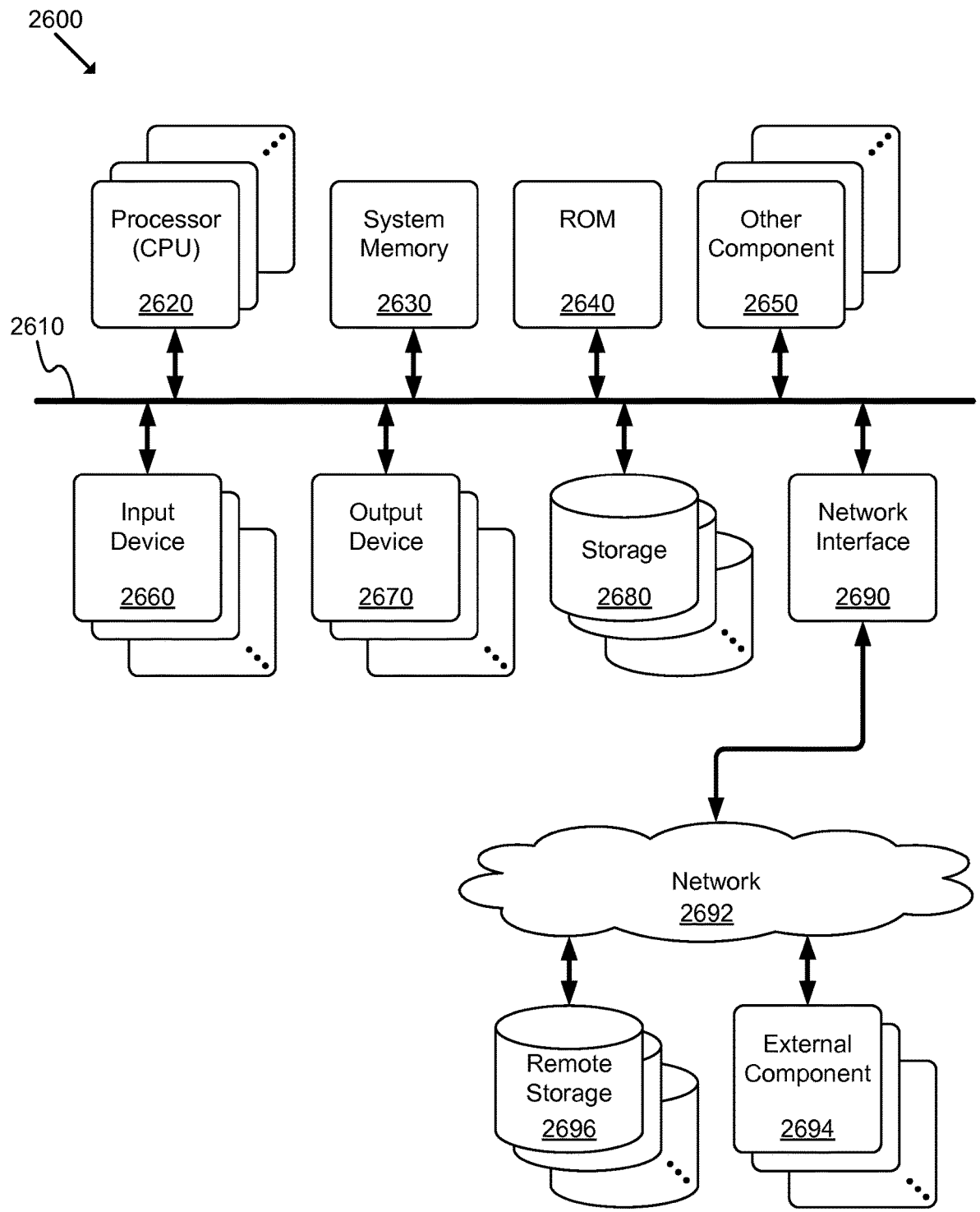
FIG. 26 illustrates a schematic block diagram of a conceptual computer system with which some embodiments of the invention may be implemented.

FIG. 26 conceptually illustrates a schematic block diagram of a computer system 2600 with which some embodiments of the invention may be implemented. For example, the system described above in reference to FIG. 1 may be at least partially implemented using computer system 2500. As another example, the processes described in reference to FIGS. 14-21 may be at least partially implemented using sets of instructions that are executed using computer system 2600.

Computer system 2600 may be implemented using various appropriate devices. For instance, the computer system may be implemented using one or more personal computers ("PC"), servers, mobile devices (e.g., a Smartphone), tablet devices, and/or any other appropriate devices. The various devices may work alone (e.g., the computer system may be implemented as a single PC) or in conjunction (e.g., some components of the computer system may be provided by a mobile device while other components are provided by a tablet device).

Computer system 2600 may include a bus 2610, at least one processing element 2620, a system memory 2630, a read-only memory ("ROM") 2640, other components (e.g., a graphics processing unit) 2650, input devices 2660, output devices 2670, permanent storage devices 2680, and/or a network connection 2690. The components of computer system 2600 may be electronic devices that automatically perform operations based on digital and/or analog input signals. For instance, the various examples of client and server applications described above in reference to FIGS. 7-9 may be at least partially implemented using sets of instructions that are run on computer system 2600.

Bus 2610 represents all communication pathways among the elements of computer system 2600. Such pathways may include wired, wireless, optical, and/or other appropriate communication pathways. For example, input devices 2660 and/or output devices 2670 may be coupled to the system 2600 using a wireless connection protocol or system. The processor 2620 may, in order to execute the processes of some embodiments, retrieve instructions to execute and data to process from components such as system memory 2630, ROM 2640, and permanent storage device 2680. Such instructions and data may be passed over bus 2610.

ROM 2640 may store static data and instructions that may be used by processor 2620 and/or other elements of the computer system. Permanent storage device 2680 may be a read-and-write memory device. This device may be a non-volatile memory unit that stores instructions and data even when computer system 2600 is off or unpowered. Permanent storage device 2680 may include a mass-storage device (such as a magnetic or optical disk and its corresponding disk drive).

Computer system 2600 may use a removable storage device and/or a remote storage device as the permanent storage device. System memory 2630 may be a volatile read-and-write memory, such as a random access memory ("RAM"). The system memory may store some of the instructions and data that the processor uses at runtime. The sets of instructions and/or data used to implement some embodiments may be stored in the system memory 2630, the permanent storage device 2680, and/or the read-only memory 2640. For example, the various memory units may include instructions for determining proximity to a sensor in accordance with some embodiments.

Other components 2650 may perform various other functions. These functions may include providing an interface to a physical sensor of some embodiments.

Input devices 2660 may enable a user to communicate information to the computer system and/or manipulate various operations of the system. The input devices may include keyboards, cursor control devices, audio input devices and/or video input devices. Output devices 2370 may include printers, displays, and/or audio devices. Some or all of the input and/or output devices may be wirelessly or optically connected to the computer system.

Finally, as shown in FIG. 26, computer system 2600 may be coupled to one or more networks 2692 through one or more network interfaces 2690. For example, computer system 2600 may be coupled to a web server on the Internet such that a web browser executing on computer system 2600 may interact with the web server as a user interacts with an interface that operates in the web browser. Computer system 2600 may be able to access one or more remote storages 2696 and one or more external components 2694 through the network interface 2690 and network 2692. The network interface(s) 2690 may include one or more application programming interfaces (APIs) that may allow the computer system 2600 to access remote systems and/or storages and also may allow remote systems and/or storages to access computer system 2600 (or elements thereof).

As used in this specification and any claims of this application, the terms "computer", "server", "processor", and "memory" all refer to electronic devices. These terms exclude people or groups of people. As used in this specification and any claims of this application, the term "non-transitory storage medium" is entirely restricted to tangible, physical objects that store information in a form that is readable by electronic devices. These terms exclude any wireless or other ephemeral signals.

It should be recognized by one of ordinary skill in the art that any or all of the components of computer system 2600 may be used in conjunction with the invention. Moreover, one of ordinary skill in the art will appreciate that many other system configurations may also be used in conjunction with the invention or components of the invention.

Moreover, while the examples shown may illustrate many individual modules as separate elements, one of ordinary skill in the art would recognize that these modules may be combined into a single functional block or element. One of ordinary skill in the art would also recognize that a single module may be divided into multiple modules.

While the invention has been described with reference to numerous specific details, one of ordinary skill in the art will recognize that the invention can be embodied in other specific forms without departing from the spirit of the invention. For example, several embodiments were described above by reference to particular features and/or components. However, one of ordinary skill in the art will realize that other embodiments might be implemented with other types of features and components. One of ordinary skill in the art would understand that the invention is not to be limited by the foregoing illustrative details, but rather is to be defined by the appended claims.

I claim:

1. A proximity system that collects consumer location information, provides customized content, and provides and applies customized offers, the proximity system comprising:
    a first proximity sensor, location at a first physical location, the first proximity sensor comprising:
        a first transmitter that transmits, to user devices within a threshold distance, a first beacon signal comprising a first unique identifier associated with the first proximity sensor; and
        a first receiver that receives a first response message from a first user device, wherein the first response message comprises a first subscriber identifier;
    a multimedia display that displays advertising content, the multimedia display located in near proximity to, and communicatively coupled to, the first proximity sensor, wherein the advertising content is selected based at least partly on the first response message, and wherein at least one of the first proximity sensor and the multimedia display sends an offer message to the first user device, the offer message comprising a special offer selected based at least partly on the selected advertising content;
    a second proximity sensor, located at a second physical location that is distinct from the first physical location, the second proximity sensor comprising:
        a second transmitter that sends, to user devices within a threshold distance, a second beacon signal comprising a second unique identifier associated with the second proximity sensor; and
        a second receiver that receives a second response message from the first user device, wherein the second response message comprises the first subscriber identifier; and
    a server communicatively coupled to the first proximity sensor and the second proximity sensor, wherein the server generates an invoice based at least partly on the special offer included in the offer message sent from the multimedia display to the first user device and sends the invoice to the first user device when the second response message is received at the second receiver.

2. The proximity system of claim 1, wherein the first and second beacon signals comprise Bluetooth signals.

3. The proximity system of claim 1, wherein:
    the first proximity sensor receives a third response message from a second user device, wherein third second response message comprises a second subscriber identifier;
    the advertising content is updated based at least partly on the third response message, and wherein at least one of the first proximity sensor and the multimedia display sends an offer message to the second user device, the offer message comprising a second special offer selected based at least partly on the updated advertising content;
    the second proximity sensor receives a fourth response message from the second user device, wherein the fourth response message comprises the second subscriber identifier; and
    the server generates a second invoice based at least partly on the second special offer and sends the second invoice to the second user device.

4. An advertising system comprising:
    an advertising medium that provides interactive advertising content to users via a multimedia output;
    a proximity sensor that detects and communicates with user devices that pass within a threshold distance of the advertising medium, wherein the proximity sensor comprises a receiver for collecting data from the detected user devices, the collected data comprising subscriber identifiers, and a communication interface that transmits the collected data; and
    a remote server that communicates with the proximity sensor via the communication interface and provides advertising content to the advertising medium, wherein the advertising content is selected based on a first subscriber identifier, wherein the server further sends an offer message comprising a special offer to a first user device associated with the first subscriber identifier and generates an invoice based at least partly on the special offer and sends the invoice to the first user device.

5. The advertising system of claim 4, wherein the multimedia output comprises a video display and the advertising content comprises video content.

6. The advertising system of claim 4, wherein the communication interface communicates over at least one of a Bluetooth link and a WiFi connection.

7. The advertising system of claim 4, wherein the proximity sensor is adapted to transmit a beacon signal comprising a sensor identifier.

8. The advertising system of claim 4, wherein the advertising content is updated based on a second subscriber identifier, and wherein the server further sends a second offer message comprising a second special offer to a second user device associated with the second subscriber identifier and generates a second invoice based at least partly on the second special offer and sends the invoice to the second user device.

9. The advertising system of claim 4, wherein the remote server is further adapted to send targeted advertising content to the user devices.

10. The advertising system of claim 7, wherein the remote server is adapted to determine a location of the proximity sensor based at least partly on the sensor identifier.

11. The advertising system of claim 9, wherein the targeted advertising content is based at least partly on the advertising content provided by the advertising medium.

12. An interactive advertising device comprising:
- a proximity sensor that detects and communicates with user devices that pass within a threshold distance of the advertising display, wherein the proximity sensor comprises (i) a receiver that collects data regarding the detected user devices, the collected data comprising at least first and second subscriber identifiers, and (ii) a communication interface that sends the collected data to a remote server; and
- a display element that displays an advertising content element from among a set of advertising content elements, wherein the advertising content element is selected based on the first subscriber identifier and the advertising content element selection is updated based on the second subscriber identifier,
- wherein a transmitter of the proximity sensor sends a first message to a first user device associated with the first subscriber identifier, the message related to the advertising content element, the first message comprising a special offer associated with the advertising content element, wherein the transmitter of the proximity sensor further sends a second message comprising an invoice, the invoice based at least partly on the special offer.

13. The interactive advertising device of claim 12, wherein the interactive advertising device selects the advertising content element to display based at least partly on information associated with at least one user device within the threshold distance of the advertising display.

14. The interactive advertising device of claim 12, wherein the proximity sensor is adapted to transmit a beacon signal comprising a sensor identifier.

15. The interactive advertising device of claim 14, wherein the beacon signal is able to be received by at least one user device that passes within a transmission distance of the beacon signal.

16. The interactive advertising device of claim 14, wherein the beacon signal is a Bluetooth signal.

17. The interactive advertising device of claim 12, wherein the interactive advertising device selects the advertising content element to display based at least partly on information received from a remote server.

* * * * *